(12) United States Patent
Tsai et al.

(10) Patent No.: US 8,379,324 B2
(45) Date of Patent: Feb. 19, 2013

(54) OPTICAL IMAGING LENS ASSEMBLY

(75) Inventors: Tsung-Han Tsai, Taichung (TW); Ming-Ta Chou, Taichung (TW)

(73) Assignee: Largan Precision Co., Taichung (TW)

( * ) Notice: Subject to any disclaimer, the term of this patent is extended or adjusted under 35 U.S.C. 154(b) by 14 days.

(21) Appl. No.: 13/277,672

(22) Filed: Oct. 20, 2011

(65) Prior Publication Data

US 2012/0300316 A1   Nov. 29, 2012

(30) Foreign Application Priority Data

May 26, 2011   (TW) .............................. 100118410 A

(51) Int. Cl.
*G02B 13/18*   (2006.01)
*G02B 9/60*    (2006.01)

(52) U.S. Cl. ........................ 359/714; 359/764

(58) Field of Classification Search .................. 359/763, 359/764, 714
See application file for complete search history.

(56) References Cited

U.S. PATENT DOCUMENTS

| | | | |
|---|---|---|---|
| 7,480,105 B2 | 1/2009 | Mori | |
| 7,502,181 B2 | 3/2009 | Shinohara | |
| 7,826,151 B2 * | 11/2010 | Tsai | 359/764 |
| 2003/0117722 A1 | 6/2003 | Chen | |
| 2004/0196571 A1 | 10/2004 | Shinohara | |

* cited by examiner

*Primary Examiner* — Scott J Sugarman
(74) *Attorney, Agent, or Firm* — Wang Law Firm, Inc.; Li K. Wang; Stephen Hsu

(57) ABSTRACT

An optical imaging lens assembly comprising five non-cemented lens elements with refractive power, sequentially arranged from an object side to an image side, comprising: the first lens element with positive refractive power, the second lens element with negative refractive power, the third lens element with refractive power having a concave object-side surface and at least one aspheric surface, the fourth lens element with positive refractive power having two aspheric surfaces, and the fifth lens element with negative refractive power having a concave object-side surface and a convex image-side surface with both being aspheric. Wherein an image sensor disposed on an image plane and a stop are also provided. By such arrangements, the image pickup optical system satisfies conditions related to shorten the total length and to reduce the sensitivity for use in compact cameras and mobile phones with camera functionalities.

25 Claims, 20 Drawing Sheets

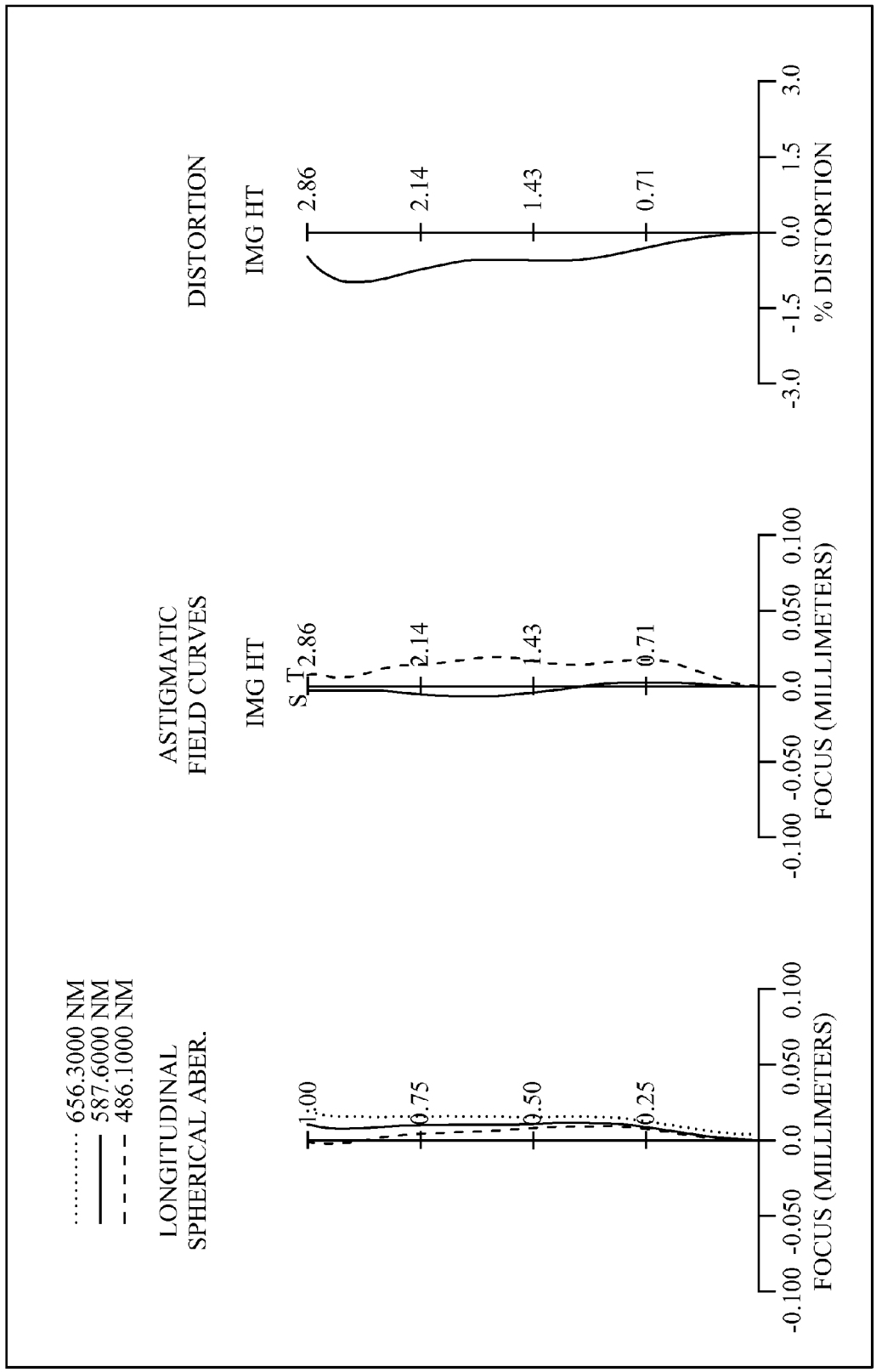

OPTICAL IMAGING LENS ASSEMBLY

BACKGROUND OF THE INVENTION

1. Field of the Invention

The present invention relates to an optical imaging lens assembly, and more particularly to the optical imaging lens assembly comprised of five non-cemented lenses with refractive power to provide a short total length with great image quality for electronic products.

2. Description of the Related Art

In compact electronic products such as digital still cameras and mobile phone cameras, an optical imaging lens assembly is generally installed for capturing images of an object, and the optical imaging lens assembly tends to be developed with a compact design and a low cost, while meeting the user requirements for good aberration correction ability, high resolution, and high image quality.

In general, a conventional optical imaging lens assembly of a compact electronic product comes with different designs, including the two-lens, three-lens, four-lens, and five-or-more lens designs. If the image quality of a compact electronic product is taken into consideration, the optical imaging lens assembly with a design of four or five lens elements has advantages on image aberration and modulation transfer function (MTF) performance, wherein the design with five lens elements having a higher resolution, and is suitable for electronic products that require the high quality and high pixel requirements.

In various compact designs of the optical imaging lens assemblies comprised of five lens elements and having a fixed focal length, the prior art adopts different combinations of positive and negative refractive powers, such as a group of stacked lenses as disclosed in U.S. Publications Nos. US2004/0196571 and US2003/0117722 and a combination of a first lens element with negative refractive power and a second lens element with positive refractive power as disclosed in U.S. Pat. No. 7,480,105. Since two glass lenses are cemented, it is difficult to control the cost for mass production, thus incurring a higher manufacturing cost. In addition, the glass lenses generally have a thickness greater than that of plastic lenses, and aspheric lenses cannot be made easily by glass, and the total length of the optical system cannot be shortened easily. If the first lens element with negative refractive power is adopted, the level of difficulty to reduce the total length of the optical system will be much higher.

In products such as compact digital cameras, web cameras, and mobile phone cameras, the optical imaging lens assembly requires a compact design, a short focal length, and a good aberration correction. As disclosed in U.S. Pat. No. 7,502,181, a fourth lens element with negative refractive power and a fifth lens element with negative refractive power are installed, thus it is difficult to reduce the total length of the optical system. In the description above, the conventional designs will increase the rear focal length and the total length of the optical imaging lens assembly. Therefore, the present invention provides a more practical design to shorten the optical imaging lens assembly, while using a combination of refractive powers of five lens elements and a combination of convex and concave optical surfaces, wherein the fourth lens element and the fifth lens element have positive refractive power and negative refractive power respectively, and this complementary combination with a telecentric effect is favorable for reducing the rear focal length and the total length of the optical imaging lens assembly effectively, and further improving the image quality and applying the optical imaging lens assembly to compact electronic products.

SUMMARY OF THE INVENTION

Therefore, it is a primary objective of the present invention to provide an optical imaging lens assembly comprising five non-cemented lenses with refractive power, sequentially arranged from an object side to an image side along an optical axis, comprising: a first lens element, a second lens element, a third lens element, a fourth lens element and a fifth lens element, wherein the first lens element has positive refractive power; the second lens element has negative refractive power; the third lens element with refractive power has a concave object-side surface, and at least one aspheric surface; the fourth lens element with positive refractive power is made of plastic, and has aspheric object-side surface and image-side surface; and the fifth lens element with negative refractive power is made of plastic and has a concave object-side surface and a convex image-side surface, and both object-side surface and image-side surface thereof being aspheric, and the following relations are satisfied:

$$1.55 < f/f_4 < 3.50 \tag{1}$$

$$0.4 < (R_7+R_8)/(R_7-R_8) < 2.5 \tag{2}$$

Wherein, f is a focal length of the optical imaging lens assembly, $f_4$ is a focal length of the fourth lens element, $R_7$ is a curvature radius of the object-side surface of the fourth lens element, and $R_8$ is a curvature radius of the image-side surface of the fourth lens element.

On the other hand, the present invention provides an optical imaging lens assembly, as described above, further comprising a stop, wherein the first lens element has a convex object-side surface; the fourth lens element has a convex image-side surface; and the optical imaging lens assembly satisfies one or more of the following relations in addition to the relations (1) and (2):

$$-0.5 < R_9/f < 0 \tag{3}$$

$$0.70 < S_D/T_D < 1.20 \tag{4}$$

$$-3.0 < f/f_5 < -1.7 \tag{5}$$

$$28 < v_1 - v_2 < 45 \tag{6}$$

Wherein, $R_9$ is a curvature radius of the object-side surface of the fifth lens element, f is the focal length of the optical imaging lens assembly, $f_5$ is a focal length of the fifth lens element, $S_D$ is an axial distance from the stop to the image-side surface of the fifth lens element, $T_D$ is an axial distance from the object-side surface of the first lens element to the image-side surface of the fifth lens element, $v_1$ is an Abbe number of the first lens element, and $v_2$ is an Abbe number of the second lens element.

On the other hand, the present invention provides an optical imaging lens assembly, as described above, further comprising an image sensor at an image plane for imaging an object to be photographed, wherein the first lens element has a convex object-side surface; the fourth lens element has a convex image-side surface; at least one of the object-side surface and the image-side surface of the fifth lens element has at least one inflection point; and the optical imaging lens assembly satisfies one or more of the following relations in addition to the relations (1) and (2):

$$-0.5 < R_9/f < 0 \tag{3}$$

$$0.02 < T_{45}/f < 0.18 \tag{7}$$

$$-10 < v_1 - (v_2+v_3) < 20 \tag{8}$$

$$-0.3 < R_9/f < 0 \tag{9}$$

$$-2.0 < (R_9 + R_{10})/(R_9 - R_{10}) < -1.02 \tag{10}$$

$$TTL/ImgH < 1.95 \tag{11}$$

Wherein, $R_9$ is the curvature radius of the object-side surface of the fifth lens element, $R_{10}$ is a curvature radius of the image-side surface of the fifth lens element, f is the focal length of the optical imaging lens assembly, $T_{45}$ is an axial distance between the fourth lens element and the fifth lens element, $v_1$ is the Abbe number of the first lens element, $v_2$ is the Abbe number of the second lens element, $v_3$ is an Abbe number of the third lens element, TTL is an axial distance from the object-side surface of the first lens element to the image plane, and ImgH is half of the diagonal length of an effective photosensitive area of the image sensor.

On the other hand, the present invention provides an optical imaging lens assembly, as described above, wherein the first lens element has a convex object-side surface; the fourth lens element has a convex image-side surface; and the optical imaging lens assembly satisfies one or more of the following relations in addition to the relations (1) and (2):

$$0.9 < R_8/R_9 < 1.25 \tag{12}$$

$$0.6 < (R_7 + R_8)/(R_7 - R_8) < 1.9 \tag{13}$$

Wherein, $R_7$ is the curvature radius of the object-side surface of the fourth lens element, $R_8$ is the curvature radius of the image-side surface of the fourth lens element, and $R_9$ is the curvature radius of the object-side surface of the fifth lens element.

Another objective of the present invention is to provide an optical imaging lens assembly, comprising five non-cemented lenses with refractive power, sequentially arranged from an object side to an image side along an optical axis, comprising: a first lens element, a second lens element, a third lens element, a fourth lens element, and a fifth lens element, wherein the first lens element has positive refractive power; the second lens element has negative refractive power; the third lens element with negative refractive power has at least one aspheric surface; the fourth lens element with positive refractive power is made of plastic and has both spheric object-side surface and image-side surface; the fifth lens element with negative refractive power is made of plastic and has a concave object-side surface and a convex image-side surface, and both object-side surface and image-side surface thereof being aspheric; and the following relation is satisfied:

$$0.4 < (R_7 + R_8)/(R_7 - R_8) < 2.5 \tag{2}$$

Wherein $R_7$ is a curvature radius of the object-side surface of the fourth lens element, and $R_8$ is a curvature radius of the image-side surface of the fourth lens element.

On the other hand, the present invention provides an optical imaging lens assembly, as described above, wherein at least one of the object-side surface and the image-side surface of the fifth lens element has at least one inflection point; and the optical imaging lens assembly satisfies one or more of the following relations in addition to the relation (2):

$$-0.5 < R_9/f < 0 \tag{3}$$

$$1.55 < f/f_4 < 3.50 \tag{1}$$

$$-3.0 < f/f_5 < -1.7 \tag{5}$$

$$-10 < v_1 - (v_2 + v_3) < 20 \tag{8}$$

$$0.9 < R_8/R_9 < 1.25 \tag{12}$$

$$-2.0 < (R_9 + R_{10})/(R_9 - R_{10}) < -1.02 \tag{10}$$

Wherein, $R_8$ is the curvature radius of the image-side surface of the fourth lens element, $R_9$ is a curvature radius of the object-side surface of the fifth lens element, $R_{10}$ is a curvature radius of the image-side surface of the fifth lens element, f is a focal length of the optical imaging lens assembly, $f_4$ is a focal length of the fourth lens element, $f_5$ is a focal length of the fifth lens element, $v_1$ is an Abbe number of the first lens element, $v_2$ is an Abbe number of the second lens element, and $v_3$ is an Abbe number of the third lens element.

Another objective of the present invention is to provide an optical imaging lens assembly, comprising five non-cemented lenses with refractive power, sequentially arranged from an object side to an image side along an optical axis, comprising: a first lens element, a second lens element, a third lens element, a fourth lens element, and a fifth lens element; wherein the first lens element has positive refractive power; the second lens element has negative refractive power; the third lens element has refractive power and at least one aspheric surface; the fourth lens element with positive refractive power, is made of plastic and has both aspheric object-side surface and image-side surface; the fifth lens element with negative refractive power is made of plastic and has a concave object-side surface and a convex image-side surface, and both object-side surface and image-side surface thereof being aspheric, and at least one of the object-side surface and image-side surface thereof has at least one inflection point; and the following relation is satisfied:

$$1.55 < f/f_4 < 3.50 \tag{1}$$

$$-0.5 < R_9/f < 0 \tag{3}$$

Wherein, $R_9$ is a curvature radius of the object-side surface of the fifth lens element, f is a focal length of the optical imaging lens assembly, and $f_4$ is a focal length of the fourth lens element.

On the other hand, the present invention provides an optical imaging lens assembly, as described above, and satisfies one or more of the following relations in addition to the relations (1) and (3):

$$0.6 < (R_7 + R_8)/(R_7 - R_8) < 1.9 \tag{13}$$

$$0.9 < R_8/R_9 < 1.25 \tag{12}$$

$$1.55 < f/f_4 < 3.50 \tag{1}$$

$$-3.0 < f/f_5 < -1.7 \tag{5}$$

Wherein, $R_7$ is a curvature radius of the object-side surface of the fourth lens element, $R_8$ is a curvature radius of the image-side surface of the fourth lens element, $R_9$ is the curvature radius of the object-side surface of the fifth lens element, f is the focal length of the optical imaging lens assembly, $f_4$ is the focal length of the fourth lens element, and $f_5$ is a focal length of the fifth lens element.

With the installation of the aforementioned first lens element, second lens element, third lens element, fourth lens element and fifth lens element with an appropriate interval apart from one another, the present invention can provide a good aberration correction and an advantageous modulation transfer function (MTF) in a greater field of view.

In the optical imaging lens assembly of the present invention, the optical imaging lens assembly is comprised of the first lens element, second lens element, third lens element, fourth lens element and fifth lens element, and the first lens element with positive refractive power provides the refractive power required by the system, and the second lens element with negative refractive power can correct aberrations produced by the lens element with positive refractive power effectively and correct the Petzval sum of the system to make the image surface on the edge flatter, and the third lens element can adjust the MTF to correct the aberration of the assembled first lens element and second lens element to enhance the resolution of the optical imaging lens assembly, so that the overall aberration and distortion of the optical imaging lens assembly can meet the high resolution requirement. With the complementary fourth lens element with positive refractive power and fifth lens element with negative refractive power, the telecentric effect can be achieved to facilitate reducing the rear focal length, so as to shorten the total length of the optical imaging lens assembly.

In the optical imaging lens assembly of the present invention, the arrangement of the stop produces a longer distance from the exit pupil of the optical imaging lens assembly to the image plane, so that the light of an image can be projected directly and then received by the image sensor to avoid dark corners or achieve the telecentric effect on the image side. In general, the telecentric effect can improve the brightness of the image plane and enhance the speed of receiving images by the CCD or CMOS image sensor.

In the optical imaging lens assembly of the present invention, the combination of the first lens element with positive refractive power, the second lens element with negative refractive power and the third lens element with positive or negative refractive power, and the mutual compensation of the fourth lens element with positive refractive power and the fifth lens element with negative refractive power can reduce the total length of the optical imaging lens assembly effectively, so that the image sensor can have a larger effective pixel range within the same total length. In other words, a shorter optical imaging lens assembly can be designed with the same effective pixel range of the image sensor.

If the fifth lens element has an inflection point, the inflection point can be used for guiding light of an image with an angle out from the edges of the fifth lens element, such that the light of an image at the off-axis view angle is guided to the image sensor and received by the image sensor. In addition, the fourth lens element and the fifth lens element can be made of plastic to facilitate the manufacture and lower the cost.

BRIEF DESCRIPTION OF THE DRAWINGS

FIG. 4B is a schematic view of a series of aberration curves of the fourth preferred embodiment of the present invention;

DETAILED DESCRIPTION OF THE PREFERRED EMBODIMENTS

Figure 1A:
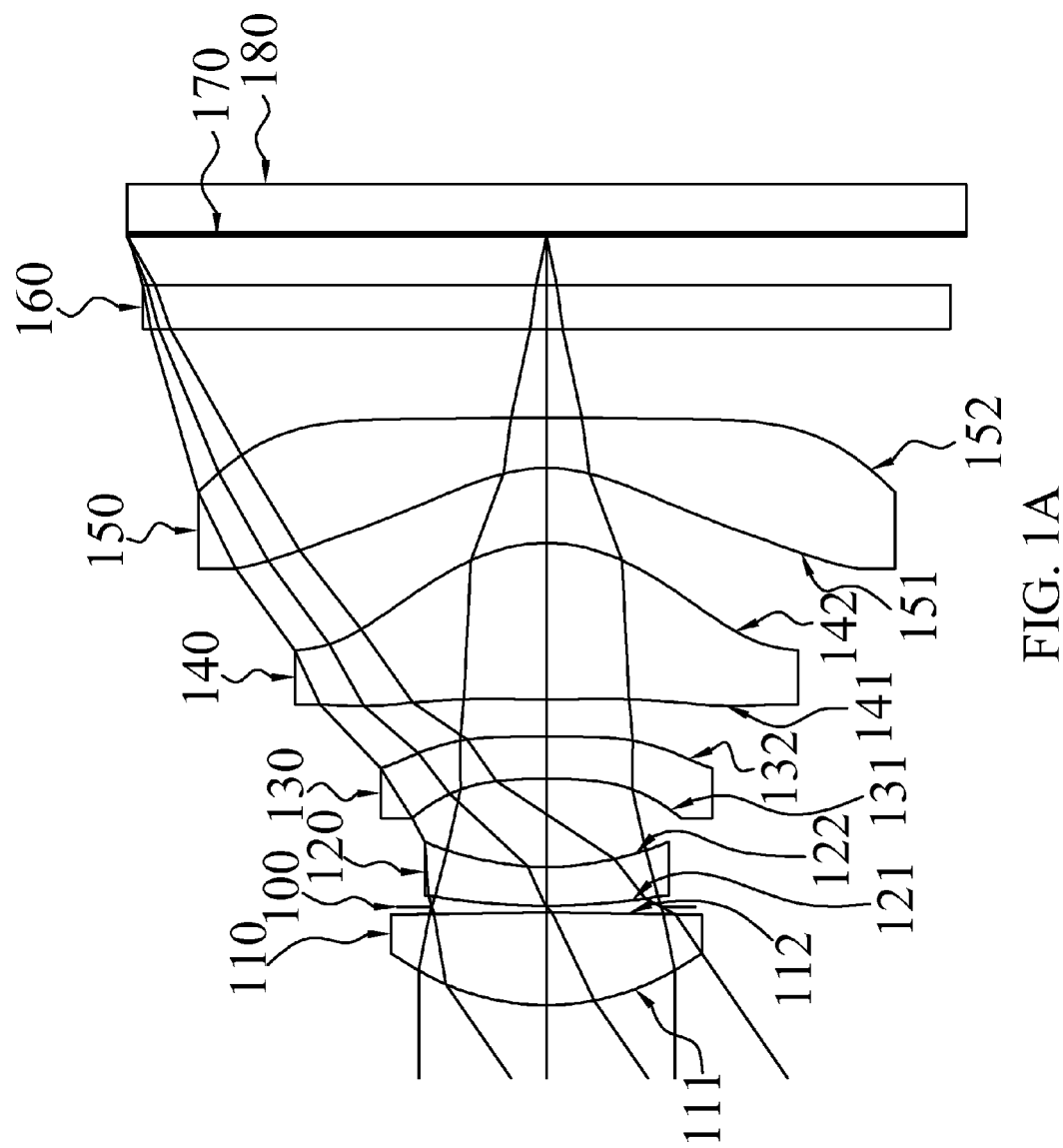
FIG. 1A is a schematic view of an optical lens in accordance with the first preferred embodiment of the present invention.

With reference to FIG. 1A for an optical imaging lens assembly of the present invention, the optical imaging lens assembly comprises five non-cemented lenses with refractive power, sequentially arranged from an object side to an image side along an optical axis, comprising: a first lens element 110, a second lens element 120, a third lens element 130, a fourth lens element 140 and a fifth lens element 150, wherein the first lens element 110 has positive refractive power; the second lens element 120 has negative refractive power; the third lens element 130 with refractive power has a concave object-side surface 131 and at least one of the object-side surface 131 and an image-side surface 132 thereof being aspheric; the fourth lens element 140 with positive refractive power is made of plastic and has both aspheric object-side surface 141 and image-side surface 142; the fifth lens element 150 with negative refractive power is made of plastic and has a concave object-side surface 151 and a convex image-side surface 152, and both object-side surface 151 and image-side surface 152 thereof being aspheric, and at least one of the object-side surface 151 and image-side surface 152 has at least one inflection point. The optical imaging lens assembly further comprises an aperture stop 100 and an IR-filter 160, wherein the aperture stop 100 is installed between the first lens element 110 and the second lens element 120, and the IR-filter 160 is installed between the fifth lens element 150 and the image plane 170 and generally made of panel glass without affecting the focal length of the optical imaging lens assembly of the present invention. The optical imaging lens assembly further comprises an image sensor 180 installed at an image plane 170 for imaging an object to be photographed. The aspheric surfaces of the first lens element 110, second lens element 120, third lens element 130, fourth lens element 140 and fifth lens element 150 comply with the aspherical surface formula as given in Equation (14).

$$X(Y) = \frac{(Y^2/R)}{1+\sqrt{(1-(1+K)(Y/R)^2)}} + \sum_i (A_i)\cdot(Y^i) \quad (14)$$

Wherein,

X is the relative height from a point on the spherical surface with a distance Y from the optical axis to a tangent plane at the tip of the optical axis of the spherical surface;

Y is the distance between a point on the curve of the spherical surface and the optical axis;

R is the curvature radius near the optical axis;

K is the conic coefficient; and $A_i$ is the $i^{th}$ level aspherical surface coefficient.

In the optical imaging lens assembly of the present invention, the first lens element 110, second lens element 120, third lens element 130, fourth lens element 140 and fifth lens element 150 can be spherical or aspherical surfaces. and if aspheric optical surfaces are adopted, then the curvature radius of the optical surface can be used for changing the refractive power to reduce or eliminate aberrations, so as to decrease the number of lens elements used in the optical imaging lens assembly and shorten the total length of the optical imaging lens assembly effectively. With the installation of the first lens element 110, second lens element 120, third lens element 130, fourth lens element 140 and fifth lens element 150, the optical imaging lens assembly of the present invention satisfies the relations (1) and (2).

In the optical imaging lens assembly of the present invention, the main positive refractive power is provided by the first lens element 110 and the fourth lens element 140. If the relation (1) is satisfied, the ratio of the focal length $f_4$ of the fourth lens element 140 to the focal length f of the optical imaging lens assembly is limited to allocate the refractive power required by the fourth lens element 140 of the optical imaging lens assembly effectively, so as to reduce the system sensitivity and provide appropriate positive refractive power required by the system. In addition, the fourth lens element 140 has a convex image-side surface 142, such that when the ratio of curvature radii of the object-side surface 141 and the image-side surface 142 as given in the relation (2) is limited, the larger the curvature radius of the image-side surface 142, the smaller is the refractive power of the fourth lens element 140. Therefore, the fourth lens element 140 can be adjusted to have appropriate refractive power to reduce the system sensitivity and facilitate the manufacture, so as to improve the yield rate and the production cost.

If the relations (3) and (9) are satisfied, the negative refractive power will be relatively weaker when the ratio in these relations is too large since the fifth lens element 150 has a concave object-side surface 151, so that the aberration correction ability is weakened. If the ratio in these relations is too small, the negative refractive power will be relatively stronger, and the total length cannot be shortened effectively. Therefore, these relations can be limited within an appropriate range to achieve both effects of correcting the aberration and reducing the total length effectively. Similarly, if the relation (12) is satisfied, the refractive powers of the fourth lens element 140 and the fifth lens element 150 can be allocated or adjusted appropriately to further correct the aberration of the optical imaging lens assembly and adjust the rear focal length and the total length. If the curvature radius $R_9$ of the object-side surface 151 of the fifth lens element 150 and the curvature radius $R_{10}$ of the image-side surface 152 of the fifth lens element 150 are limited (as shown in the relation (10)), the change of the shape of the fifth lens element 150 can be limited, not only facilitating the correction of the system aberration, but also facilitating the allocation of the refractive power of the fifth lens element 150 and complement the positive refractive power of the fourth lens element 140.

If the relation (11) is satisfied, the total length of the optical imaging lens assembly can be reduced effectively, so that the image sensor can have a larger effective pixel range within the same total length. Similarly, if the relation (4) is satisfied, the position of the stop and the distance from the first lens element 110 to the fifth lens element 150 can be adjusted to shorten the length of the optical imaging lens assembly. If the relation (7) is satisfied, the focal length f per unit length of the optical imaging lens assembly can adjust the distance from the image-side surface 142 of the fourth lens element 140 to the object-side surface 151 of the fifth lens element 150 to facilitate reducing the total length of the optical imaging lens assembly.

If the relation (6) is satisfied, the difference between the Abbe number $v_1$ of the first lens element 110 and the Abbe number $v_2$ of the second lens element 120 falls within an appropriate range to correct the chromatic aberration produced by the first lens element 110 and the second lens element 120 and improve the chromatic aberration correction ability of the second lens element 120. Similarly, if the relation (8) is satisfied, the chromatic aberration correction ability of the second lens element 120 and the third lens element 130 can be enhanced.

The optical imaging lens assembly of the present invention is described by means of preferred embodiments with relevant drawings as follows.

<First Preferred Embodiment>

Figure 1B:
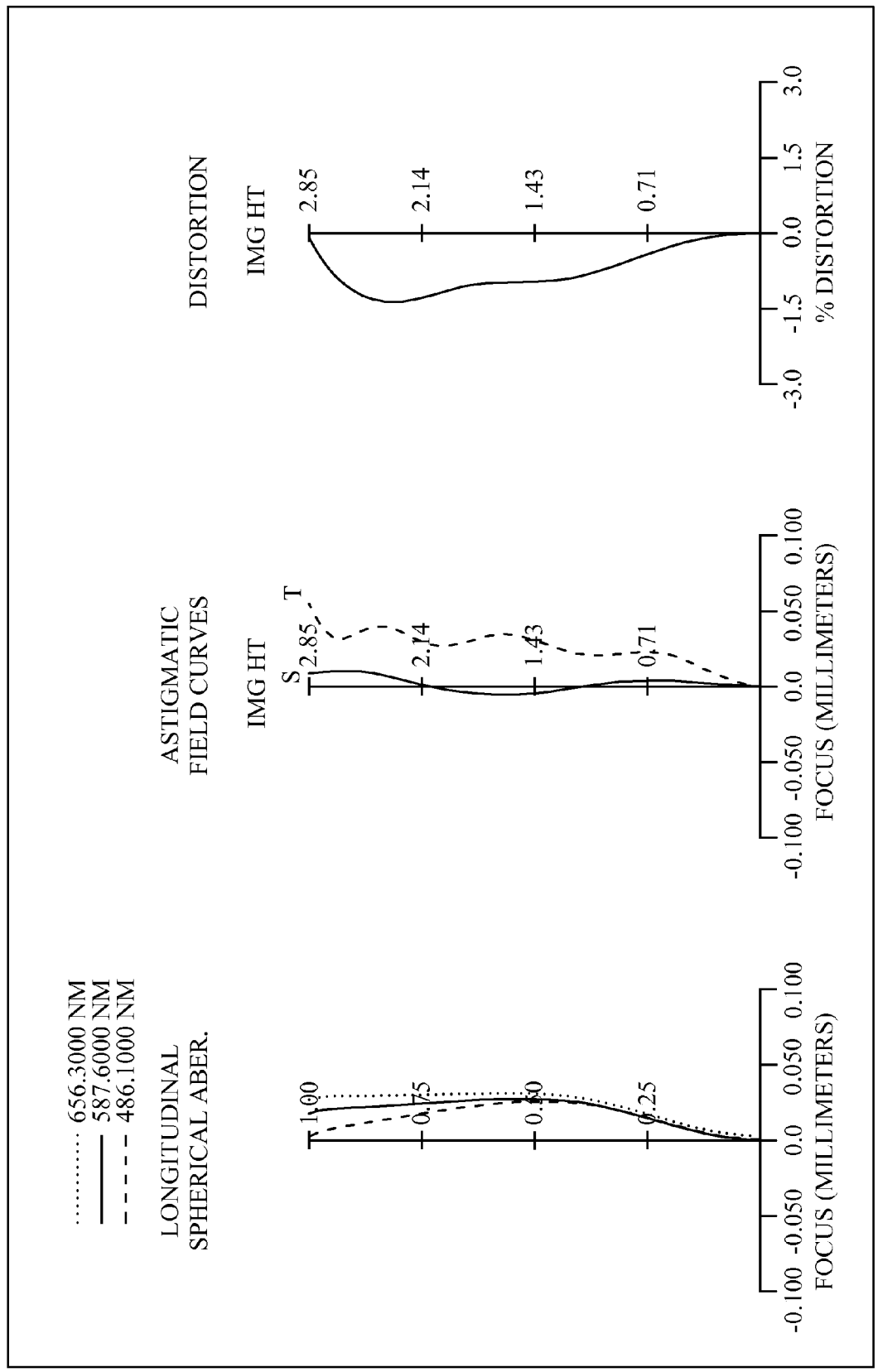
FIG. 1B is a schematic view of a series of aberration curves of the first preferred embodiment of the present invention.

With reference to FIGS. 1A and 1B for a schematic view and a series of aberration curves of an optical image lens assembly in accordance with the first preferred embodiment of the present invention respectively, the optical imaging lens assembly comprises five non-cemented lenses with refractive power, an aperture stop 100 and an IR-filter 160. More specifically, the optical imaging lens assembly, sequentially arranged from an object side to an image side along an optical axis, comprises: a plastic first lens element 110 with positive refractive power, having a convex object-side surface 111 and a convex image-side surface 112, and both object-side surface 111 and image-side surface 112 thereof being aspheric; an aperture stop 100; a plastic second lens element 120 with negative refractive power, having a convex object-side surface 121 and a concave image-side surface 122, and both object-side surface 121 and image-side surface 122 thereof being aspheric; a plastic third lens element 130 with negative refractive power, having a concave object-side surface 131 and a convex image-side surface 132, and both object-side surface 131 and image-side surface 132 being aspheric; a plastic fourth lens element 140 with positive refractive power, having a convex object-side surface 141 and a convex image-side surface 142, and both object-side surface 141 and image-side surface 142 being aspheric; a plastic fifth lens element 150 with negative refractive power, having a concave object-side surface 151 and a convex image-side surface 152, and both object-side surface 151 and image-side surface 152 thereof being aspheric, and at least one of the object-side surface 151 and image-side surface 152 thereof having at least one inflection point; a glass IR-filter 160, made of panel glass for adjusting a wavelength section of the light of an image; and an image sensor 180 installed at an image plane 170. With the combination of the five lens elements, the aperture stop 100 and the IR-filter 160, an image of the object to be photographed can be formed at the image sensor 180.

TABLE 1

Optical data of this preferred embodiment
f = 4.14 mm, Fno = 2.40, HFOV = 34.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.736030 (ASP) | 0.631 | Plastic | 1.544 | 55.9 | 2.95 |
| 2 | | −18.509600 (ASP) | 0.038 | | | | |
| 3 | Ape. Stop | Plano | 0.008 | | | | |
| 4 | Lens 2 | 4.076600 (ASP) | 0.264 | Plastic | 1.634 | 23.8 | −5.62 |
| 5 | | 1.852670 (ASP) | 0.602 | | | | |
| 6 | Lens 3 | −3.812000 (ASP) | 0.287 | Plastic | 1.634 | 23.8 | −6.56 |
| 7 | | −47.393400 (ASP) | 0.252 | | | | |
| 8 | Lens 4 | 12.987400 (ASP) | 1.065 | Plastic | 1.544 | 55.9 | 1.86 |
| 9 | | −1.065340 (ASP) | 0.510 | | | | |
| 10 | Lens 5 | −1.063820 (ASP) | 0.345 | Plastic | 1.544 | 55.9 | −2.09 |
| 11 | | −18.450200 (ASP) | 0.600 | | | | |
| 12 | IR-filter | Plano | 0.300 | Glass | 1.517 | 64.2 | — |
| 13 | | Plano | 0.335 | | | | |
| 14 | Image | Plano | — | | | | |

Note:
Reference wavelength is 587.6 nm.
ASP stands for aspherical surfaces.

The optical data of this preferred embodiment are listed in Table 1, wherein the object-side surface and the image-side surface of the first lens element 110 to the fifth lens element 150 comply with the aspheric surface formula as given in Equation (14), and their aspheric coefficients are listed in Table 2 as follows:

TABLE 2

Aspheric coefficients of this preferred embodiment

| | Surface # | | | | |
|---|---|---|---|---|---|
| | 1 | 2 | 4 | 5 | 6 |
| k = | −7.26016E−01 | −1.00000E+00 | −7.50656E+00 | −1.00000E+00 | 3.00000E+00 |
| A4 = | 1.73325E−02 | 8.42251E−03 | −7.85854E−02 | −1.02422E−01 | −2.69651E−01 |
| A6 = | 2.43582E−02 | 5.18034E−02 | 1.85765E−01 | 1.41611E−01 | 8.93336E−02 |
| A8 = | −4.91007E−02 | −5.35781E−02 | −1.89019E−01 | −8.06089E−02 | −1.75391E−01 |
| A10 = | 5.50506E−02 | −6.57263E−02 | 1.28560E−01 | 1.82684E−02 | 1.87723E−01 |
| A12 = | −3.34017E−02 | 1.19766E−01 | −1.05664E−01 | 3.10189E−02 | −2.52004E−02 |
| A14 = | 5.21552E−03 | −4.98156E−02 | 8.44373E−02 | −5.02247E−04 | 2.49936E−04 |

| | Surface # | | | | |
|---|---|---|---|---|---|
| | 7 | 8 | 9 | 10 | 11 |
| k = | −1.00000E+00 | −1.00000E+00 | −7.47279E−01 | −2.13568E+00 | −1.00000E+00 |
| A4 = | −2.73081E−01 | −1.39149E−01 | 9.05801E−02 | 1.15389E−01 | 3.03435E−02 |
| A6 = | 1.70993E−01 | 7.38942E−02 | −3.22101E−02 | −4.26279E−02 | −1.60039E−02 |
| A8 = | −1.28326E−01 | 9.50584E−03 | 3.62534E−02 | 7.52812E−03 | 1.96761E−03 |
| A10 = | 8.02572E−02 | −1.93390E−02 | −1.08500E−02 | −6.83537E−04 | 1.70253E−05 |
| A12 = | −3.12027E−03 | 6.44817E−03 | 1.20830E−03 | 5.17745E−05 | −2.00616E−05 |
| A14 = | −5.82394E−03 | −7.68452E−04 | −3.43090E−05 | −3.81357E−06 | −1.72308E−06 |
| A16= | | | | 6.92412E−08 | 4.07827E−07 |

With reference to Table 1 and FIG. 1B for an optical imaging lens assembly of this preferred embodiment, the optical imaging lens assembly has a focal length f=4.14 (mm), an overall aperture value (f-number) Fno=2.40, and a half of maximum view angle HFOV=34.5°. After the optical data of this preferred embodiment are calculated and derived, the optical imaging lens assembly satisfies related conditions as shown in Table 3 below, and the related symbols have been described above and thus will not be described again.

TABLE 3

Data of related relations of this preferred embodiment

| Relation | Data | Relation | Data |
|---|---|---|---|
| $R_8/R_9$ | 1.00 | $T_{45}/f$ | 0.12 |
| $v_1 - v_2$ | 32.1 | $f/f_5$ | −1.98 |
| $v_1 - (v_2 + v_3)$ | 8.3 | $f/f_4$ | 2.23 |
| $R_9/f$ | −0.26 | $S_D/T_D$ | 0.83 |
| $(R_7 + R_8)/(R_7 - R_8)$ | 0.85 | TTL/ImgH | 1.80 |
| $(R_9 + R_{10})/(R_9 - R_{10})$ | −1.12 | | |

According to the optical data as shown in Table 1 and the aberration curves as shown in FIG. 1B, the optical imaging lens assembly in accordance with this preferred embodiment of the present invention provides good correction results in aspects of the longitudinal spherical aberration, astigmatic field curving, and distortion.

<Second Preferred Embodiment>

Figure 2A:
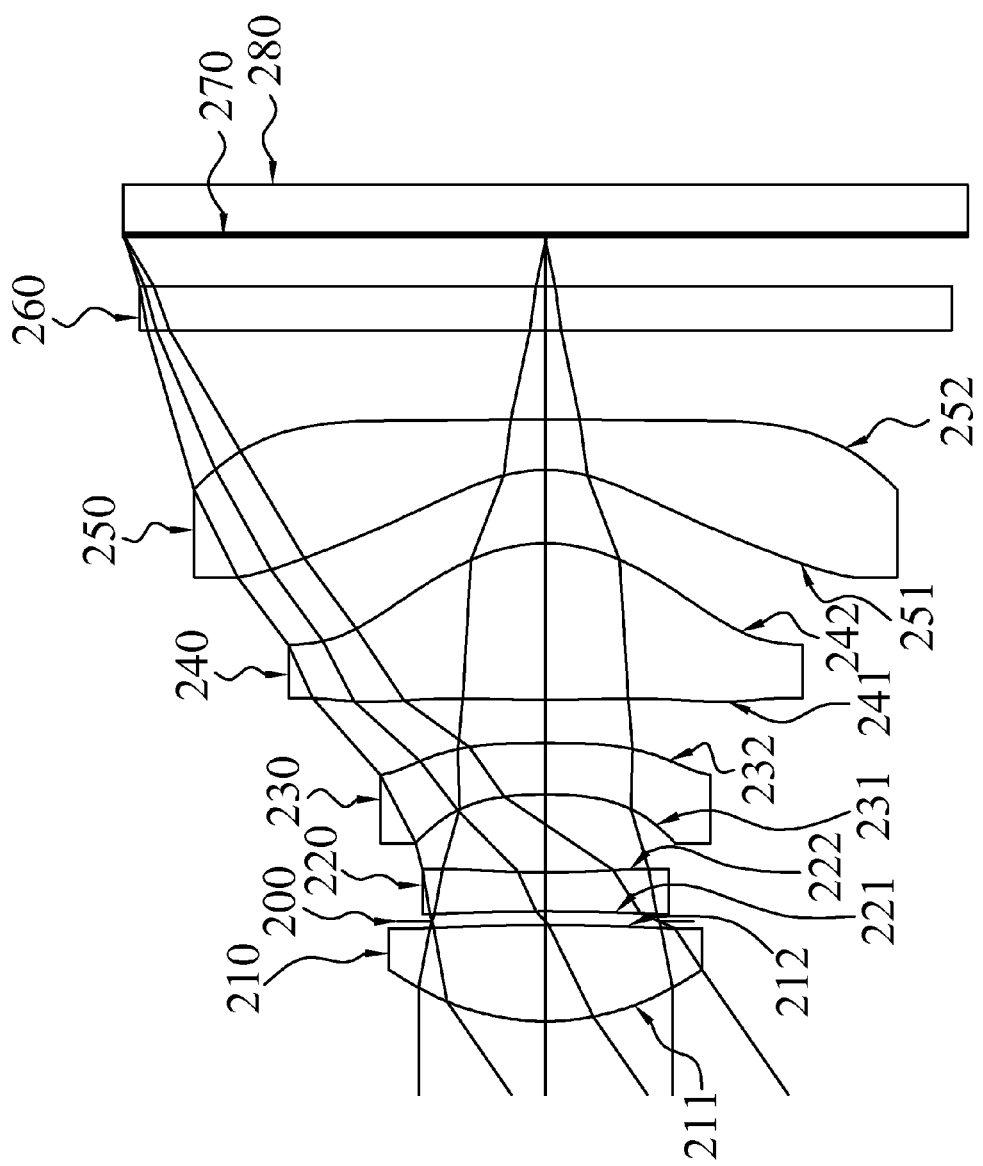
FIG. 2A is a schematic view of an optical lens in accordance with the second preferred embodiment of the present invention.
Figure 2B:
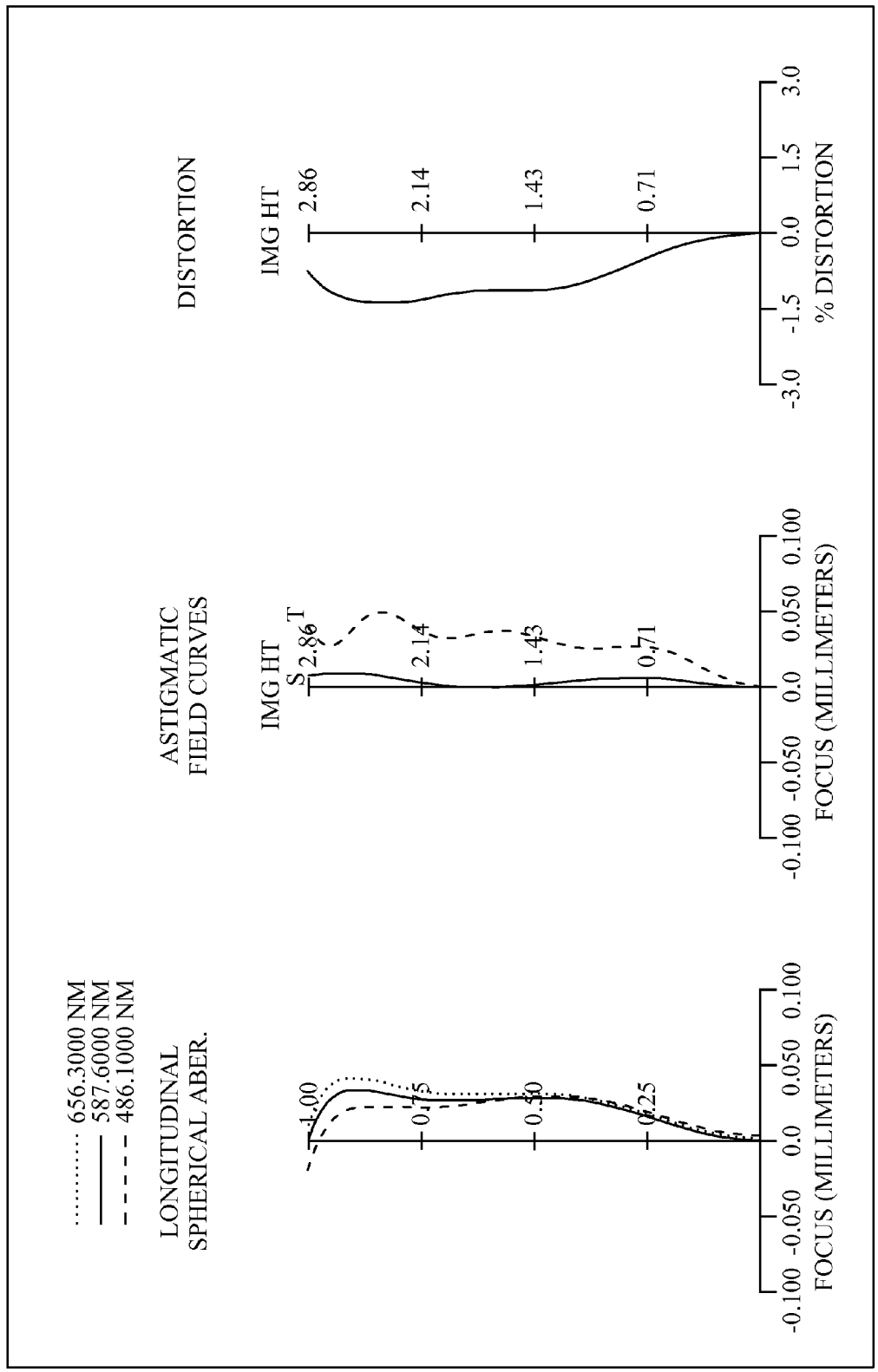
FIG. 2B is a schematic view of a series of aberration curves of the second preferred embodiment of the present invention.

With reference to FIGS. 2A and 2B for a schematic view and a series of aberration curves of an optical image lens assembly in accordance with the second preferred embodiment of the present invention respectively, the optical imaging lens assembly comprises five non-cemented lenses with refractive power, an aperture stop 200 and an IR-filter 260. More specifically, the optical imaging lens assembly, sequentially arranged from an object side to an image side along an optical axis, comprises: a plastic first lens element 210 with positive refractive power, having a convex object-side surface 211 and a convex image-side surface 212, and both object-side surface 211 and image-side surface 212 thereof being aspheric; an aperture stop 200; a plastic second lens element 220 with negative refractive power, having a concave object-side surface 221 and a concave image-side surface 222, and both object-side surface 221 and image-side surface 222 thereof being aspheric; a plastic third lens element 230 with negative refractive power, having a concave object-side surface 231 and a convex image-side surface 232, and both object-side surface 231 and image-side surface 232 being aspheric; a plastic fourth lens element 240 with positive refractive power, having a convex object-side surface 241 and a convex image-side surface 242, and both object-side surface 241 and image-side surface 242 being aspheric; a plastic fifth lens element 250 with negative refractive power, having a concave object-side surface 251 and a convex image-side surface 252, and both object-side surface 251 and image-side surface 252 thereof being aspheric, and at least one of the object-side surface 251 and image-side surface 252 thereof having at least one inflection point; a glass IR-filter 260, made of panel glass for adjusting a wavelength section of the light of an image; and an image sensor 280 installed at an image plane 270. With the combination of the five lens elements, the aperture stop 200 and the IR-filter 260, an image of the object to be photographed can be formed at the image sensor 280.

TABLE 4

Optical data of this preferred embodiment
f = 4.16 mm, Fno = 2.42, HFOV = 34.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.743580 (ASP) | 0.651 | Plastic | 1.544 | 55.9 | 2.92 |
| 2 | | −15.503700 (ASP) | 0.024 | | | | |
| 3 | Ape. Stop | Plano | 0.070 | | | | |
| 4 | Lens 2 | −19.011400 (ASP) | 0.264 | Plastic | 1.634 | 23.8 | −7.13 |
| 5 | | 5.958400 (ASP) | 0.528 | | | | |
| 6 | Lens 3 | −2.616620 (ASP) | 0.347 | Plastic | 1.634 | 23.8 | −5.08 |
| 7 | | −14.694800 (ASP) | 0.292 | | | | |
| 8 | Lens 4 | 7.241000 (ASP) | 1.062 | Plastic | 1.544 | 55.9 | 1.81 |
| 9 | | −1.078390 (ASP) | 0.497 | | | | |
| 10 | Lens 5 | −0.988750 (ASP) | 0.345 | Plastic | 1.544 | 55.9 | −1.93 |
| 11 | | −18.450200 (ASP) | 0.600 | | | | |
| 12 | IR-filter | Plano | 0.300 | Glass | 1.517 | 64.2 | — |
| 13 | | Plano | 0.334 | | | | |
| 14 | Image | Plano | — | | | | |

Note:
Reference wavelength is 587.6 nm.
ASP stands for aspherical surfaces.

The optical data of this preferred embodiment are listed in Table 4, wherein the object-side surface and the image-side surface of the first lens element 210 to the fifth lens element 250 comply with the aspheric surface formula as given in Equation (14), and their aspheric coefficients are listed in Table 5 as follows:

TABLE 5

Aspheric coefficients of this preferred embodiment

| Surface # | 1 | 2 | 4 | 5 | 6 |
|---|---|---|---|---|---|
| k = | −8.04791E−01 | −1.00000E+00 | −1.00000E+01 | −1.00000E+00 | 2.99994E+00 |
| A4 = | 1.50510E−02 | −6.12298E−03 | −5.50116E−02 | −8.91182E−02 | −3.09675E−01 |
| A6 = | 3.06131E−02 | 4.82198E−02 | 1.77356E−01 | 8.72488E−02 | 6.47383E−02 |
| A8 = | −5.40847E−02 | −5.15160E−02 | −2.83564E−01 | −1.41840E−01 | −1.72737E−01 |
| A10 = | 5.53797E−02 | −5.85889E−02 | 2.15582E−01 | 3.06101E−02 | 2.20109E−01 |
| A12 = | −3.36573E−02 | 1.18791E−01 | −1.07113E−01 | 3.27214E−02 | −2.50722E−02 |
| A14 = | 5.15173E−03 | −5.35846E−02 | 8.38942E−02 | 4.06113E−03 | 5.01595E−04 |

| Surface # | 7 | 8 | 9 | 10 | 11 |
|---|---|---|---|---|---|
| k = | −1.00000E+00 | −1.00000E+00 | −7.57505E−01 | −1.96020E+00 | −1.00000E+00 |
| A4 = | −2.90351E−01 | −1.42970E−01 | 9.22654E−02 | 1.16560E−01 | 3.15738E−02 |
| A6 = | 1.86760E−01 | 7.29719E−02 | −3.20087E−02 | −4.24710E−02 | −1.60778E−02 |
| A8 = | −1.16970E−01 | 9.44155E−03 | 3.61147E−02 | 7.57437E−03 | 2.03632E−03 |
| A10 = | 8.04911E−02 | −1.92238E−02 | −1.09229E−02 | −6.75179E−04 | 1.62791E−05 |
| A12 = | −4.26514E−03 | 6.45602E−03 | 1.20034E−03 | 5.24733E−05 | −2.09779E−05 |
| A14 = | −5.87485E−03 | −7.78351E−04 | −3.41938E−05 | −4.13325E−06 | −1.81226E−06 |
| A16= | | | | 9.10163E−09 | 4.02385E−07 |

With reference to Table 4 and FIG. 2B for an optical imaging lens assembly of this preferred embodiment, the optical imaging lens assembly has a focal length f=4.16 (mm), an overall aperture value (f-number) Fno=2.42, and a half of maximum view angle HFOV=34.6°. After the optical data of this preferred embodiment are calculated and derived, the optical imaging lens assembly satisfies related conditions as shown in Table 6 below, and the related symbols have been described above and thus will not be described again.

TABLE 6

Data of related relations of this preferred embodiment

| Relation | Data | Relation | Data |
|---|---|---|---|
| $R_8/R_9$ | 1.09 | $T_{45}/f$ | 0.12 |
| $v_1 - v_2$ | 32.1 | $f/f_5$ | −2.16 |
| $v_1 - (v_2 + v_3)$ | 8.3 | $f/f_4$ | 2.30 |
| $R_9/f$ | −0.24 | $S_D/T_D$ | 0.83 |
| $(R_7 + R_8)/(R_7 - R_8)$ | 0.74 | $TTL/ImgH$ | 1.83 |
| $(R_9 + R_{10})/(R_9 - R_{10})$ | −1.11 | | |

According to the optical data as shown in Table 4 and the aberration curves as shown in FIG. 2B, the optical imaging lens assembly in accordance with this preferred embodiment of the present invention provides good correction results in aspects of the longitudinal spherical aberration, astigmatic field curving, and distortion.

<Third Preferred Embodiment>

Figure 3A:
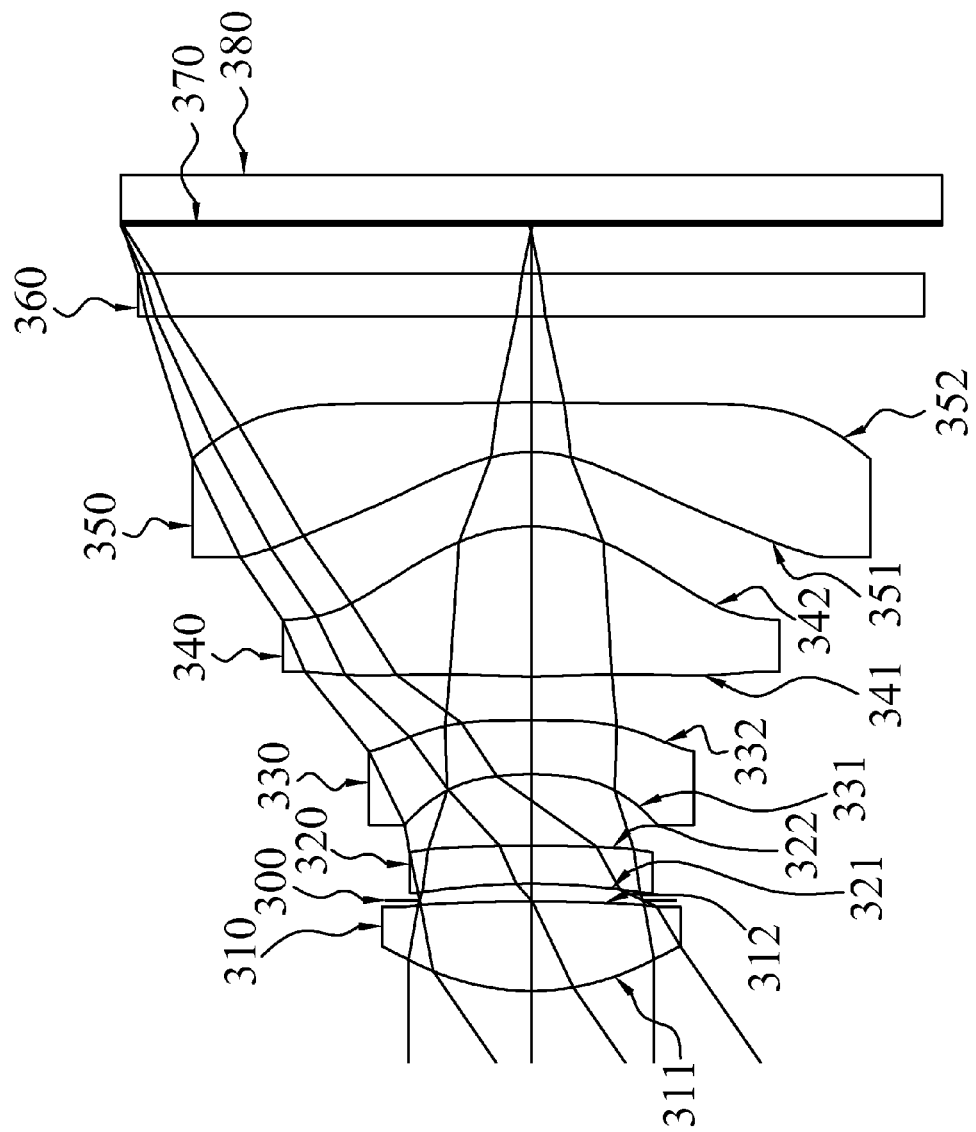
FIG. 3A is a schematic view of an optical lens in accordance with the third preferred embodiment of the present invention.
Figure 3B:
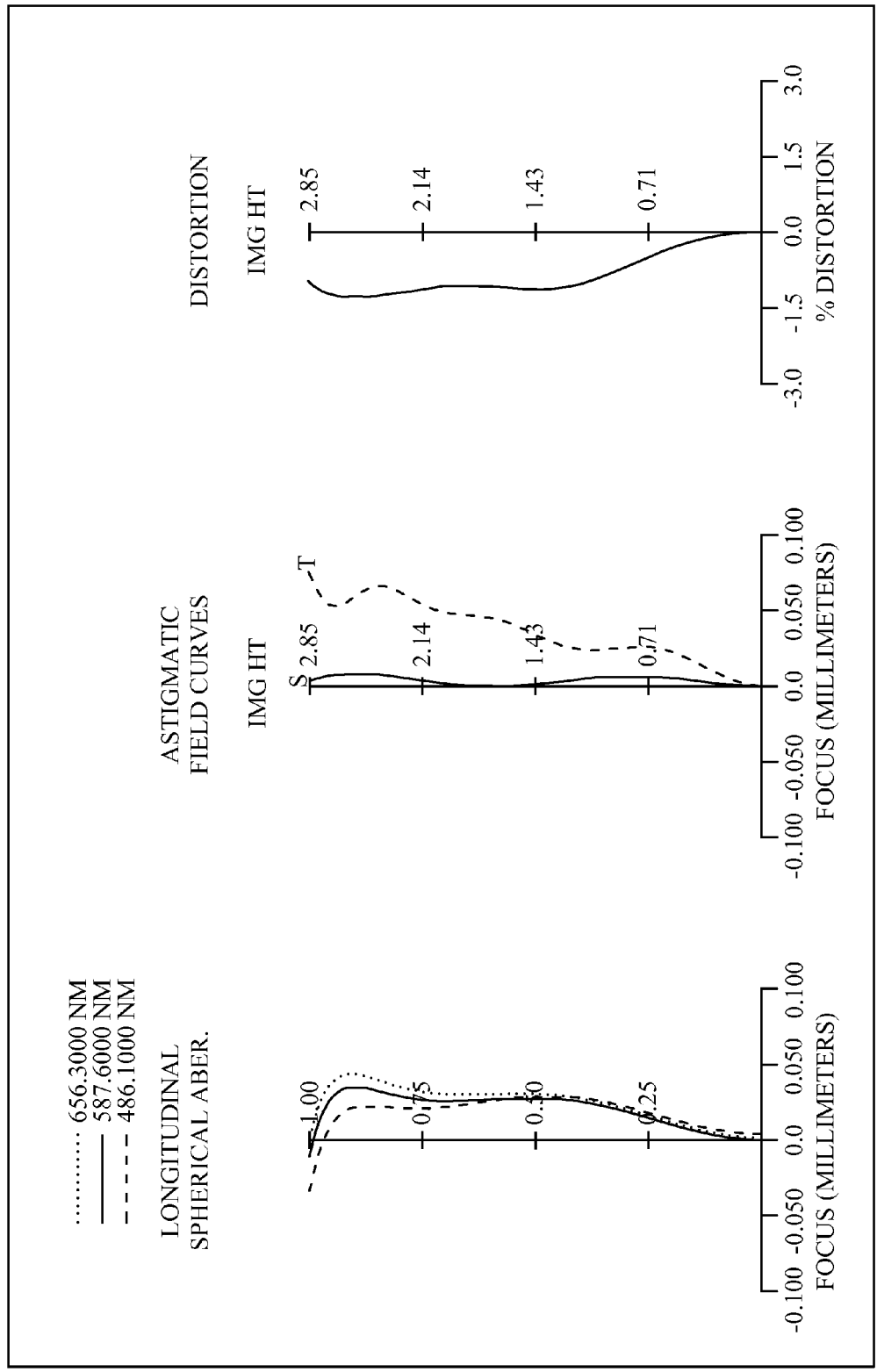
FIG. 3B is a schematic view of a series of aberration curves of the third preferred embodiment of the present invention.

With reference to FIGS. 3A and 3B for a schematic view and a series of aberration curves of an optical image lens assembly in accordance with the third preferred embodiment of the present invention respectively, the optical imaging lens assembly comprises five non-cemented lenses with refractive power, an aperture stop 300 and an IR-filter 360. More specifically, the optical imaging lens assembly, sequentially arranged from an object side to an image side along an optical axis, comprises: a plastic first lens element 310 with positive refractive power, having a convex object-side surface 311 and a convex image-side surface 312, and both object-side surface 311 and image-side surface 312 thereof being aspheric; an aperture stop 300; a plastic second lens element 320 with negative refractive power, having a concave object-side surface 321 and a convex image-side surface 322, and both object-side surface 321 and image-side surface 322 thereof being aspheric; a plastic third lens element 330 with negative refractive power, having a concave object-side surface 331 and a convex image-side surface 332, and both object-side surface 331 and image-side surface 332 being aspheric; a plastic fourth lens element 340 with positive refractive power, having a convex object-side surface 341 and a convex image-side surface 342, and both object-side surface 341 and image-side surface 342 being aspheric; a plastic fifth lens element 350 with negative refractive power, having a concave object-side surface 351 and a convex image-side surface 352, and both object-side surface 351 and image-side surface 352 thereof being aspheric, and at least one of the object-side surface 351 and image-side surface 352 thereof having at least one inflection point; a glass IR-filter 360, made of panel glass for adjusting a wavelength section of the light of an image; and an image sensor 380 installed at an image plane 370. With the combination of the five lens elements, the aperture stop 300 and the IR-filter 360, an image of the object to be photographed can be formed at the image sensor 380.

TABLE 7

Optical data of this preferred embodiment
f = 4.17 mm, Fno = 2.44, HFOV = 34.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.749820 (ASP) | 0.624 | Plastic | 1.544 | 55.9 | 2.91 |
| 2 | | −14.779100 (ASP) | 0.009 | | | | |
| 3 | Ape. Stop | Plano | 0.115 | | | | |

TABLE 7-continued

Optical data of this preferred embodiment
f = 4.17 mm, Fno = 2.44, HFOV = 34.6 deg.

| Surface # | | Curvature Radius | Thickness | Material | Index | Abbe # | Focal Length |
|---|---|---|---|---|---|---|---|
| 4 | Lens 2 | −4.390800 (ASP) | 0.264 | Plastic | 1.634 | 23.8 | −9.11 |
| 5 | | −18.761700 (ASP) | 0.498 | | | | |
| 6 | Lens 3 | −2.317490 (ASP) | 0.377 | Plastic | 1.634 | 23.8 | −4.35 |
| 7 | | −15.393300 (ASP) | 0.306 | | | | |
| 8 | Lens 4 | 6.249000 (ASP) | 1.044 | Plastic | 1.544 | 55.9 | 1.83 |
| 9 | | −1.114690 (ASP) | 0.520 | | | | |
| 10 | Lens 5 | −0.993840 (ASP) | 0.345 | Plastic | 1.544 | 55.9 | −1.94 |
| 11 | | −18.450200 (ASP) | 0.600 | | | | |
| 12 | IR-filter | Plano | 0.300 | Glass | 1.517 | 64.2 | |
| 13 | | Plano | 0.333 | | | | |
| 14 | Image | Plano | — | | | | |

Note:
Reference wavelength is 587.6 nm.
ASP stands for aspherical surfaces.

The optical data of this preferred embodiment are listed in Table 7, wherein the object-side surface and the image-side surface of the first lens element 310 to the fifth lens element 350 comply with the aspheric surface formula as given in Equation (14), and their aspheric coefficients are listed in Table 8 as follows:

TABLE 8

Aspheric coefficients of this preferred embodiment

| Surface # | | | | | |
|---|---|---|---|---|---|
| | 1 | 2 | 4 | 5 | 6 |
| k = | −9.13257E−01 | −1.00000E+00 | −1.00000E+01 | −1.00000E+00 | 3.00000E+00 |
| A4 = | 1.27045E−02 | −2.06057E−02 | −2.61372E−02 | −5.10255E−02 | −3.17271E−01 |
| A6 = | 2.74654E−02 | 4.93646E−02 | 1.61260E−01 | 6.96161E−02 | 7.92072E−02 |
| A8 = | −5.04598E−02 | −7.10990E−02 | −3.05703E−01 | −1.51333E−01 | −1.06057E−01 |
| A10 = | 4.25743E−02 | −4.72814E−02 | 2.36214E−01 | 3.38989E−02 | 1.63110E−01 |
| A12 = | −3.36572E−02 | 1.18791E−01 | −1.07113E−01 | 3.27215E−02 | −2.50721E−02 |
| A14 = | 5.15176E−03 | −5.35846E−02 | 8.38942E−02 | 4.06116E−03 | 5.01624E−04 |

| Surface # | | | | |
|---|---|---|---|---|
| 7 | 8 | 9 | 10 | 11 |
| k = −1.00000E+00 | −1.00000E+00 | −7.64055E−01 | −2.00233E+00 | −1.00000E+00 |
| A4 = −3.00743E−01 | −1.40069E−01 | 9.05594E−02 | 1.13331E−01 | 3.46905E−02 |
| A6 = 2.10175E−01 | 7.09015E−02 | −3.18076E−02 | −4.23894E−02 | −1.64984E−02 |
| A8 = −1.19082E−01 | 9.38216E−03 | 3.56283E−02 | 7.60914E−03 | 2.07772E−03 |
| A10 = 7.13337E−02 | −1.91191E−02 | −1.10176E−02 | −6.72670E−04 | 1.74151E−05 |
| A12 = −6.43791E−03 | 6.46984E−03 | 1.19316E−03 | 5.38167E−05 | −2.14689E−05 |
| A14 = −3.75455E−03 | −7.85642E−04 | −2.86394E−05 | −4.10511E−06 | −1.76468E−06 |
| A16= | | | −3.29942E−08 | 4.02907E−07 |

With reference to Table 7 and FIG. 3B for an optical imaging lens assembly of this preferred embodiment, the optical imaging lens assembly has a focal length f=4.17 (mm), an overall aperture value (f-number) Fno=2.44, and a half of maximum view angle HFOV=34.6°. After the optical data of this preferred embodiment are calculated and derived, the optical imaging lens assembly satisfies related conditions as shown in Table 9 below, and the related symbols have been described above and thus will not be described again.

TABLE 9

Data of related relations of this preferred embodiment

| Relation | Data |
|---|---|
| $R_8/R_9$ | 1.12 |
| $v_1 - v_2$ | 32.1 |

TABLE 9-continued

Data of related relations of this preferred embodiment

| Relation | Data |
|---|---|
| $v_1 - (v_2 + v_3)$ | 8.3 |
| $R_9/f$ | −0.24 |
| $(R_7 + R_8)/(R_7 - R_8)$ | 0.70 |
| $(R_9 + R_{10})/(R_9 - R_{10})$ | −1.11 |
| $T_{45}/f$ | 0.12 |
| $f/f_5$ | −2.15 |
| $f/f_4$ | 2.28 |
| $S_D/T_D$ | 0.85 |
| TTL/ImgH | 1.83 |

According to the optical data as shown in Table 7 and the aberration curves as shown in FIG. 3B, the optical imaging lens assembly in accordance with this preferred embodiment of the present invention provides good correction results in aspects of the longitudinal spherical aberration, astigmatic field curving, and distortion.

<Fourth Preferred Embodiment>

Figure 4A:
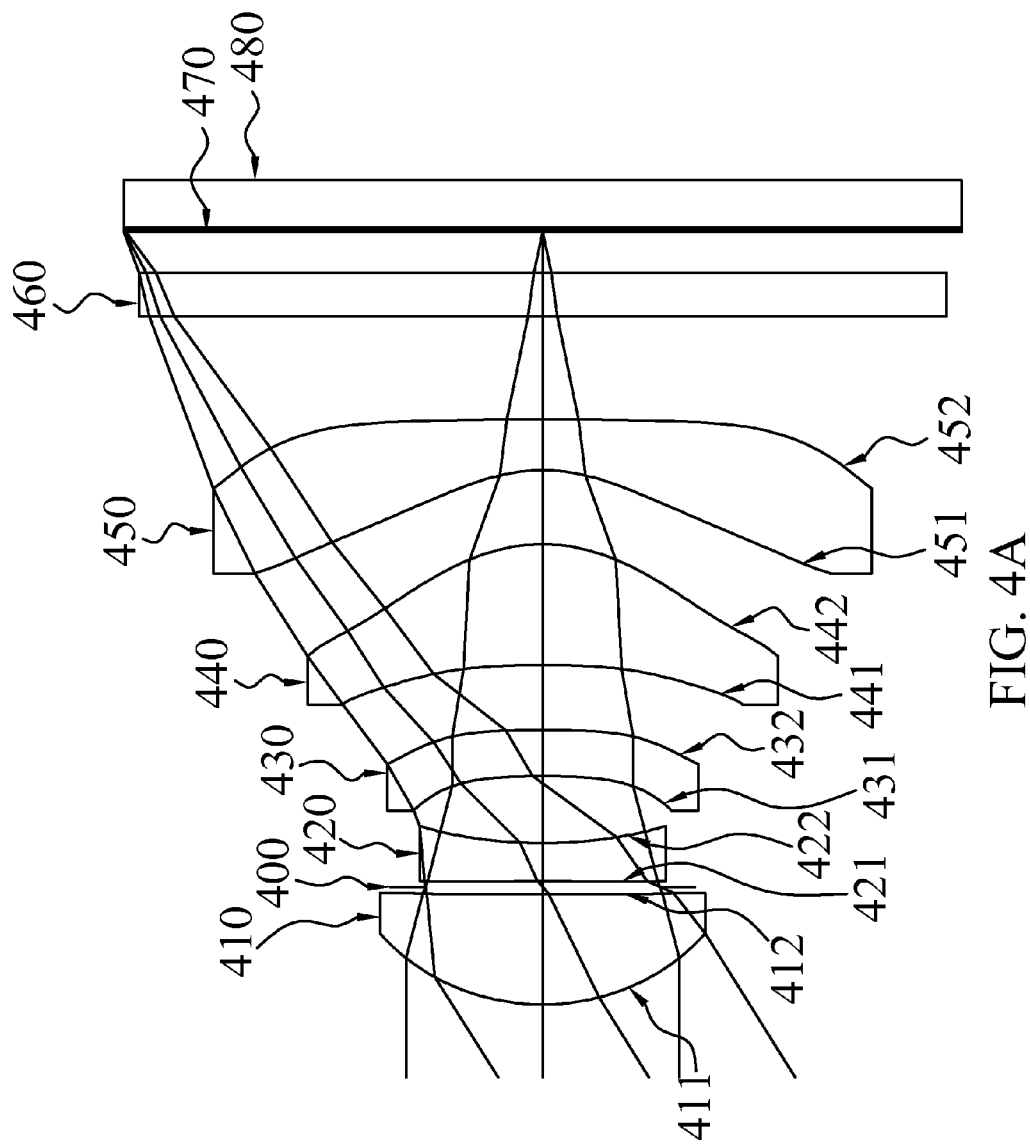
FIG. 4A is a schematic view of an optical lens in accordance with the fourth preferred embodiment of the present invention.

With reference to FIGS. 4A and 4B for a schematic view and a series of aberration curves of an optical image lens assembly in accordance with the fourth preferred embodiment of the present invention respectively, the optical imaging lens assembly comprises five non-cemented lenses with refractive power, an aperture stop 400 and an IR-filter 460. More specifically, the optical imaging lens assembly, sequentially arranged from an object side to an image side along an optical axis, comprises: a plastic first lens element 410 with positive refractive power, having a convex object-side surface 411 and a convex image-side surface 412, and both object-side surface 411 and image-side surface 412 thereof being aspheric; an aperture stop 400; a plastic second lens element 420 with negative refractive power, having a concave object-side surface 421 and a concave image-side surface 422, and both object-side surface 421 and image-side surface 422 thereof being aspheric; a plastic third lens element 430 with negative refractive power, having a concave object-side surface 431 and a convex image-side surface 432, and both object-side surface 431 and image-side surface 432 being aspheric; a plastic fourth lens element 440 with positive refractive power, having a concave object-side surface 441 and a convex image-side surface 442, and both object-side surface 441 and image-side surface 442 being aspheric; a plastic fifth lens element 450 with negative refractive power, having a concave object-side surface 451 and a convex image-side surface 452, and both object-side surface 451 and image-side surface 452 thereof being aspheric, and at least one of the object-side surface 451 and image-side surface 452 thereof having at least one inflection point; a glass IR-filter 460, made of panel glass for adjusting a wavelength section of the light of an image; and an image sensor 480 installed at an image plane 470. With the combination of the five lens elements, the aperture stop 400 and the IR-filter 460, an image of the object to be photographed can be formed at the image sensor 480.

TABLE 10

Optical data of this preferred embodiment
f = 4.57 mm, Fno = 2.45, HFOV = 32.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.558140 (ASP) | 0.757 | Plastic | 1.544 | 55.9 | 2.73 |
| 2 | | −25.730400 (ASP) | 0.046 | | | | |
| 3 | Ape. Stop | Plano | 0.040 | | | | |
| 4 | Lens 2 | −22.159700 (ASP) | 0.260 | Plastic | 1.634 | 23.8 | −4.51 |
| 5 | | 3.291400 (ASP) | 0.458 | | | | |
| 6 | Lens 3 | −5.429400 (ASP) | 0.315 | Plastic | 1.634 | 23.8 | −22.89 |
| 7 | | −8.879700 (ASP) | 0.444 | | | | |
| 8 | Lens 4 | −6.827600 (ASP) | 0.824 | Plastic | 1.544 | 55.9 | 2.42 |
| 9 | | −1.150360 (ASP) | 0.506 | | | | |
| 10 | Lens 5 | −1.133390 (ASP) | 0.350 | Plastic | 1.535 | 56.3 | −2.27 |
| 11 | | −18.587400 (ASP) | 0.700 | | | | |
| 12 | IR-filter | Plano | 0.300 | Glass | 1.517 | 64.2 | |
| 13 | | Plano | 0.278 | | | | |
| 14 | Image | Plano | — | | | | |

Note:
Reference wavelength is 587.6 nm.
ASP stands for aspherical surfaces.

The optical data of this preferred embodiment are listed in Table 10, wherein the object-side surface and the image-side surface of the first lens element 410 to the fifth lens element 450 comply with the aspheric surface formula as given in Equation (14), and their aspheric coefficients are listed in Table 11 as follows:

TABLE 11

Aspheric coefficients of this preferred embodiment

| Surface # | 1 | 2 | 4 | 5 | 6 |
|---|---|---|---|---|---|
| k = | −5.82989E−01 | −1.00000E+00 | 3.73983E+02 | −1.00000E+00 | −6.01011E+01 |
| A4 = | 2.19235E−02 | 4.59412E−02 | 4.77999E−02 | 1.25562E−02 | −2.78959E−01 |
| A6 = | 2.66709E−02 | −3.39737E−02 | −2.09552E−02 | −3.54047E−03 | 5.08314E−02 |
| A8 = | −3.95824E−02 | 4.62463E−02 | −3.56539E−04 | 3.68894E−02 | −1.68151E−01 |
| A10 = | 5.72844E−02 | −4.28087E−02 | 8.18099E−02 | −6.79630E−02 | 2.03302E−02 |
| A12 = | −3.52738E−02 | 2.03949E−03 | −1.40835E−01 | 5.35561E−02 | 8.46118E−02 |
| A14 = | 8.60352E−03 | 1.36219E−02 | 8.41915E−02 | 7.93322E−09 | 7.90905E−09 |

| Surface # | 7 | 8 | 9 | 10 | 11 |
|---|---|---|---|---|---|
| k = | −1.00000E+00 | −2.08437E+00 | −8.17755E−01 | −1.86980E+00 | −1.00000E+00 |
| A4 = | −1.91839E−01 | −1.01153E−01 | 5.76715E−02 | 1.13165E−01 | 1.98571E−02 |
| A6 = | 6.55814E−02 | 4.43497E−02 | −2.03799E−02 | −4.25816E−02 | −1.43392E−02 |

TABLE 11-continued

Aspheric coefficients of this preferred embodiment

| A8 = | −9.40251E−02 | 9.23350E−03 | 3.56954E−02 | 7.50418E−03 | 2.03738E−03 |
|---|---|---|---|---|---|
| A10 = | 6.95807E−02 | −1.39739E−02 | −1.23582E−02 | −6.76709E−04 | 5.61727E−06 |
| A12 = | −1.09319E−02 | 7.14900E−03 | 8.56881E−04 | 5.55063E−05 | −2.96278E−05 |
| A14 = | 1.17069E−02 | −2.14174E−03 | 2.75189E−05 | −3.13819E−06 | −2.40407E−06 |
| A16 = | | | | 5.63188E−08 | 8.24025E−07 |

With reference to Table 10 and FIG. 4B for an optical imaging lens assembly of this preferred embodiment, the optical imaging lens assembly has a focal length f=4.57 (mm), an overall aperture value (f-number) Fno=2.45, and a half of maximum view angle HFOV=32.1°. After the optical data of this preferred embodiment are calculated and derived, the optical imaging lens assembly satisfies related conditions as shown in Table 12 below, and the related symbols have been described above and thus will not be described again.

TABLE 12

Data of related relations of this preferred embodiment

| Relation | Data |
|---|---|
| $R_8/R_9$ | 1.01 |
| $v_1 - v_2$ | 32.5 |
| $v_1 - (v_2 + v_3)$ | 9.1 |
| $R_9/f$ | −0.25 |
| $(R_7 + R_8)/(R_7 - R_8)$ | 1.41 |
| $(R_9 + R_{10})/(R_9 - R_{10})$ | −1.13 |
| $T_{45}/f$ | 0.11 |
| $f/f_5$ | −2.01 |
| $f/f_4$ | 1.89 |
| $S_D/T_D$ | 0.80 |
| TTL/ImgH | 1.81 |

According to the optical data as shown in Table 10 and the aberration curves as shown in FIG. 4B, the optical imaging lens assembly in accordance with this preferred embodiment of the present invention provides good correction results in aspects of the longitudinal spherical aberration, astigmatic field curving, and distortion.

<Fifth Preferred Embodiment>

Figure 5A:
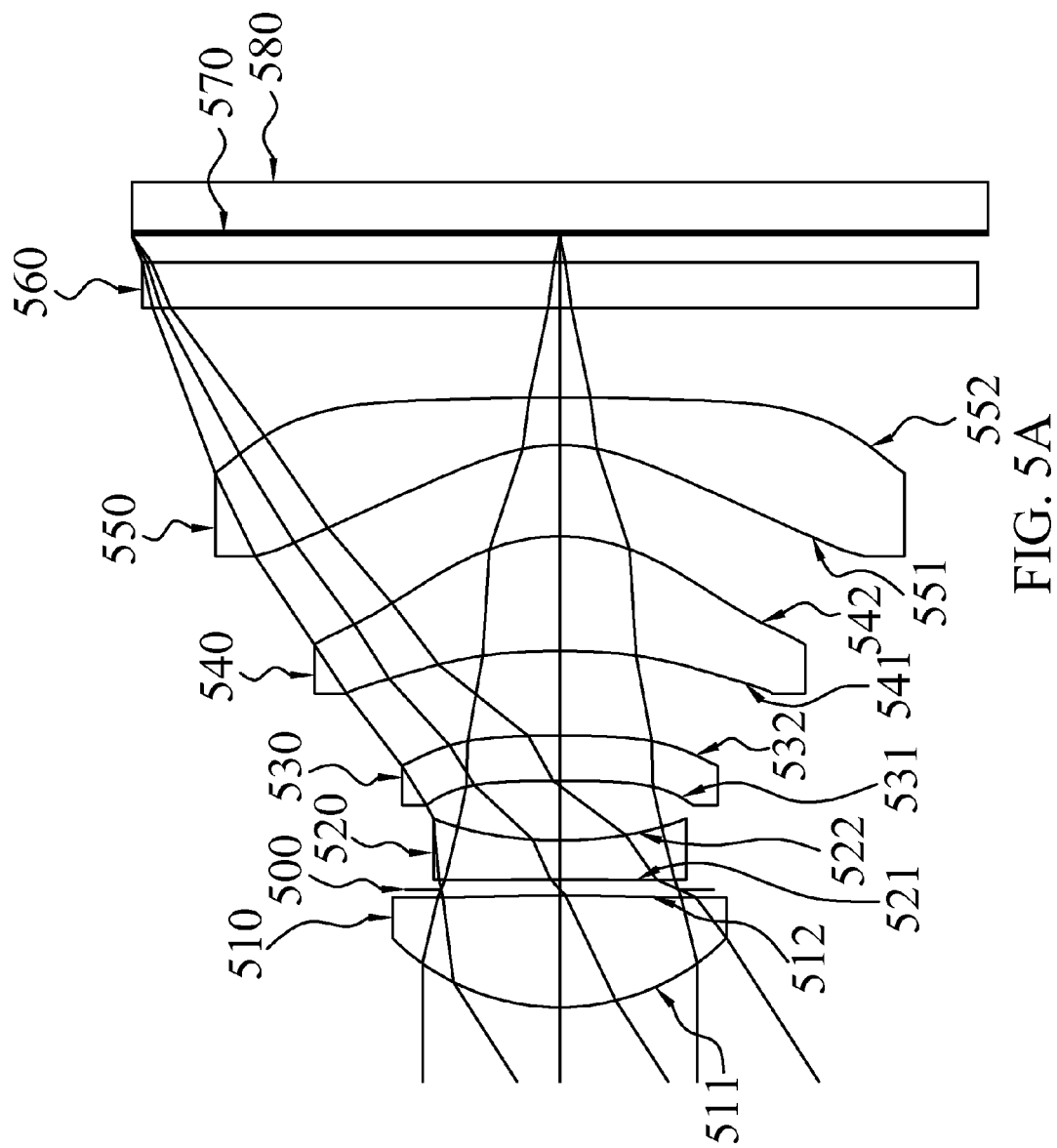
FIG. 5A is a schematic view of an optical lens in accordance with the fifth preferred embodiment of the present invention.
Figure 5B:
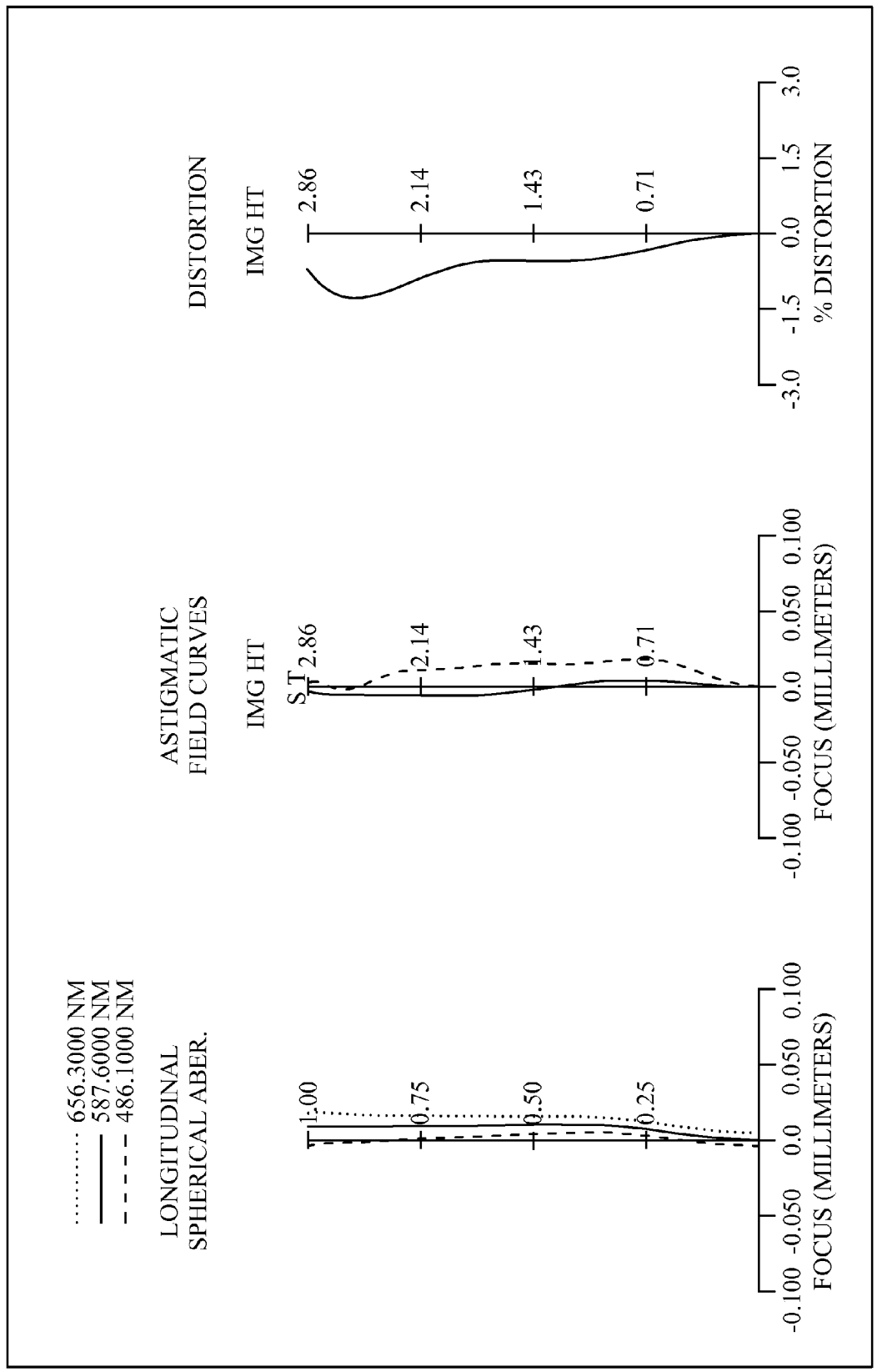
FIG. 5B is a schematic view of a series of aberration curves of the fifth preferred embodiment of the present invention.

With reference to FIGS. 5A and 5B for a schematic view and a series of aberration curves of an optical image lens assembly in accordance with the fifth preferred embodiment of the present invention respectively, the optical imaging lens assembly comprises five non-cemented lenses with refractive power, an aperture stop 500 and an IR-filter 560. More specifically, the optical imaging lens assembly, sequentially arranged from an object side to an image side along an optical axis, comprises: a plastic first lens element 510 with positive refractive power, having a convex object-side surface 511 and a convex image-side surface 512, and both object-side surface 511 and image-side surface 512 thereof being aspheric; an aperture stop 500; a plastic second lens element 520 with negative refractive power, having a concave object-side surface 521 and a concave image-side surface 522, and both object-side surface 521 and image-side surface 522 thereof being aspheric; a plastic third lens element 530 with positive refractive power, having a concave object-side surface 531 and a convex image-side surface 532, and both object-side surface 531 and image-side surface 532 being aspheric; a plastic fourth lens element 540 with positive refractive power, having a concave object-side surface 541 and a convex image-side surface 542, and both object-side surface 541 and image-side surface 542 being aspheric; a plastic fifth lens element 550 with negative refractive power, having a concave object-side surface 551 and a convex image-side surface 552, and both object-side surface 551 and image-side surface 552 thereof being aspheric, and at least one of the object-side surface 551 and image-side surface 552 thereof having at least one inflection point; a glass IR-filter 560, made of panel glass for adjusting a wavelength section of the light of an image; and an image sensor 580 installed at an image plane 570. With the combination of the five lens elements, the aperture stop 500 and the IR-filter 560, an image of the object to be photographed can be formed at the image sensor 580.

TABLE 13

Optical data of this preferred embodiment
f = 4.50 mm, Fno = 2.45, HFOV = 32.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.596690 (ASP) | 0.748 | Plastic | 1.544 | 55.9 | 2.62 |
| 2 | | −11.304400 (ASP) | 0.040 | | | | |
| 3 | Ape. Stop | Plano | 0.067 | | | | |
| 4 | Lens 2 | −15.750900 (ASP) | 0.260 | Plastic | 1.634 | 23.8 | −3.62 |
| 5 | | 2.706830 (ASP) | 0.398 | | | | |
| 6 | Lens 3 | −19.531200 (ASP) | 0.303 | Plastic | 1.634 | 23.8 | 33.91 |
| 7 | | −10.295300 (ASP) | 0.565 | | | | |
| 8 | Lens 4 | −4.707900 (ASP) | 0.765 | Plastic | 1.544 | 55.9 | 2.89 |
| 9 | | −1.247370 (ASP) | 0.610 | | | | |
| 10 | Lens 5 | −1.166940 (ASP) | 0.320 | Plastic | 1.544 | 55.9 | −2.37 |
| 11 | | −13.605400 (ASP) | 0.600 | | | | |
| 12 | IR-filter | Plano | 0.300 | Glass | 1.517 | 64.2 | |
| 13 | | Plano | 0.182 | | | | |
| 14 | Image | Plano | — | | | | |

Note:
Reference wavelength is 587.6 nm.
ASP stands for aspherical surfaces.

The optical data of this preferred embodiment are listed in Table 13, wherein the object-side surface and the image-side surface of the first lens element 510 to the fifth lens element 550 comply with the aspheric surface formula as given in Equation (14), and their aspheric coefficients are listed in Table 14 as follows:

TABLE 14

Aspheric coefficients of this preferred embodiment

| Surface # | 1 | 2 | 4 | 5 | 6 |
|---|---|---|---|---|---|
| k = | −6.38905E−01 | −1.00000E+00 | 3.00000E+00 | −1.00000E+00 | −4.00000E+01 |
| A4 = | 1.98831E−02 | 5.58766E−02 | 4.97593E−02 | 1.37048E−03 | −1.96079E−01 |
| A6 = | 2.26866E−02 | −3.30644E−02 | −4.89253E−03 | 3.50307E−02 | 2.20981E−02 |
| A8 = | −3.85164E−02 | 2.85439E−02 | −2.45694E−02 | 7.96323E−03 | −1.39082E−01 |
| A10 = | 5.41141E−02 | −4.06475E−02 | 9.64193E−02 | −4.57772E−02 | 5.22288E−02 |
| A12 = | −3.53269E−02 | 3.86308E−02 | −1.39896E−01 | 5.34506E−02 | 2.56772E−02 |
| A14 = | 8.81495E−03 | −1.39844E−02 | 8.44376E−02 | −5.02024E−04 | 2.50159E−04 |

| Surface # | 7 | 8 | 9 | 10 | 11 |
|---|---|---|---|---|---|
| k = | −1.00000E+00 | −8.21067E+00 | −7.41870E−01 | −1.64207E+00 | −1.00000E+00 |
| A4 = | −1.49086E−01 | −9.43368E−02 | 3.53659E−02 | 1.14770E−01 | 2.54914E−02 |
| A6 = | 4.29332E−02 | 4.63557E−02 | −1.01167E−02 | −4.22375E−02 | −1.51341E−02 |
| A8 = | −8.21071E−02 | 1.25029E−02 | 3.31653E−02 | 7.53931E−03 | 1.99340E−03 |
| A10 = | 6.42961E−02 | −1.70870E−02 | −1.21002E−02 | −6.77923E−04 | 1.58247E−05 |
| A12 = | −2.17038E−02 | 6.63112E−03 | 1.04455E−03 | 5.42692E−05 | −2.62516E−05 |
| A14 = | 1.56627E−02 | −1.29311E−03 | 2.28381E−05 | −3.44482E−06 | −2.31161E−06 |
| A16 = | | | | 7.42044E−09 | 7.01646E−07 |

With reference to Table 13 and FIG. 5B for an optical imaging lens assembly of this preferred embodiment, the optical imaging lens assembly has a focal length f=4.50 (mm), an overall aperture value (f-number) Fno=2.45, and a half of maximum view angle HFOV=32.6°. After the optical data of this preferred embodiment are calculated and derived, the optical imaging lens assembly satisfies related conditions as shown in Table 15 below, and the related symbols have been described above and thus will not be described again.

TABLE 15

Data of related relations of this preferred embodiment

| Relation | Data |
|---|---|
| $R_8/R_9$ | 1.07 |
| $v_1 - v_2$ | 32.1 |
| $v_1 - (v_2 + v_3)$ | 8.3 |
| $R_9/f$ | −0.26 |
| $(R_7 + R_8)/(R_7 - R_8)$ | 1.72 |
| $(R_9 + R_{10})/(R_9 - R_{10})$ | −1.19 |
| $T_{45}/f$ | 0.14 |
| $f/f_5$ | −1.90 |
| $f/f_4$ | 1.56 |
| $S_D/T_D$ | 0.81 |
| TTL/ImgH | 1.77 |

According to the optical data as shown in Table 13 and the aberration curves as shown in FIG. 5B, the optical imaging lens assembly in accordance with this preferred embodiment of the present invention provides good correction results in aspects of the longitudinal spherical aberration, astigmatic field curving, and distortion.

<Sixth Preferred Embodiment>

Figure 6A:
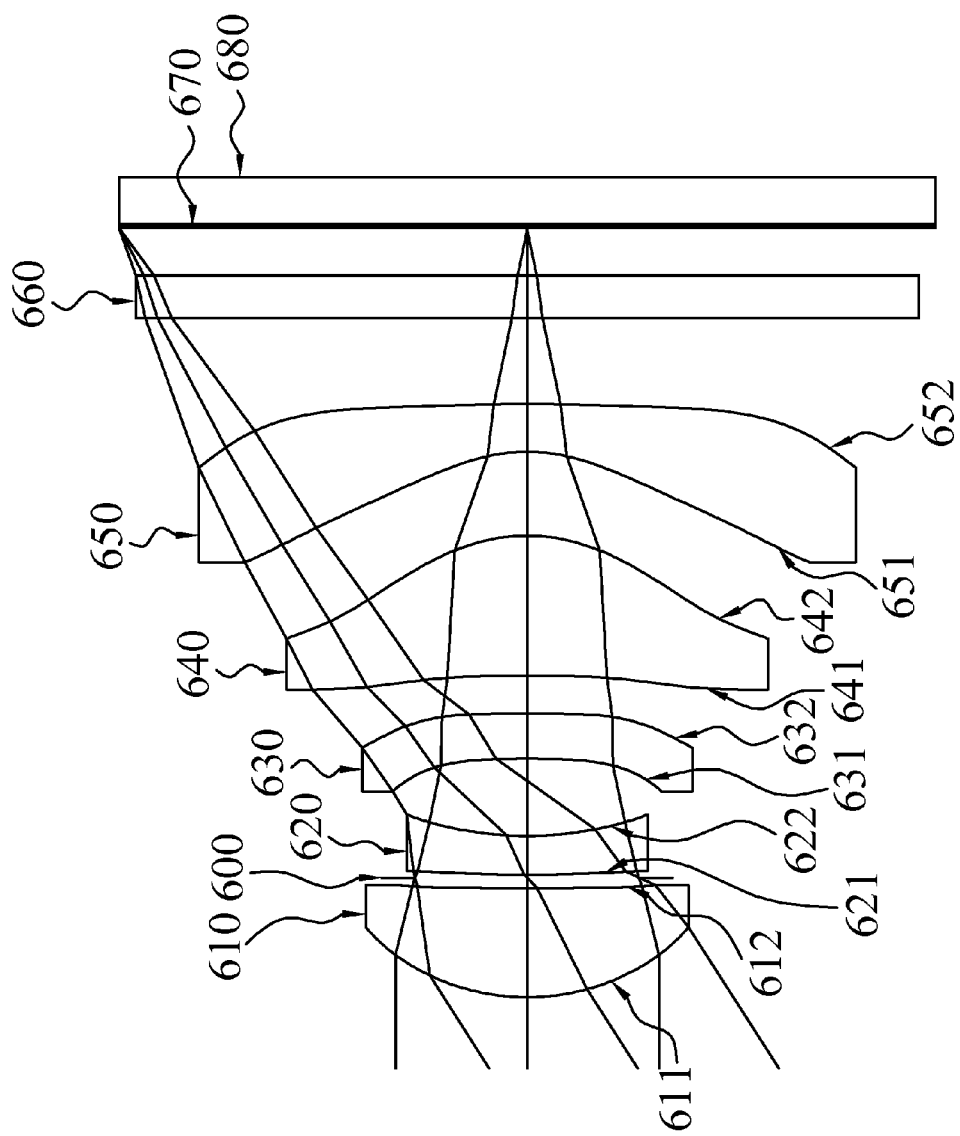
FIG. 6A is a schematic view of an optical lens in accordance with the sixth preferred embodiment of the present invention.
Figure 6B:
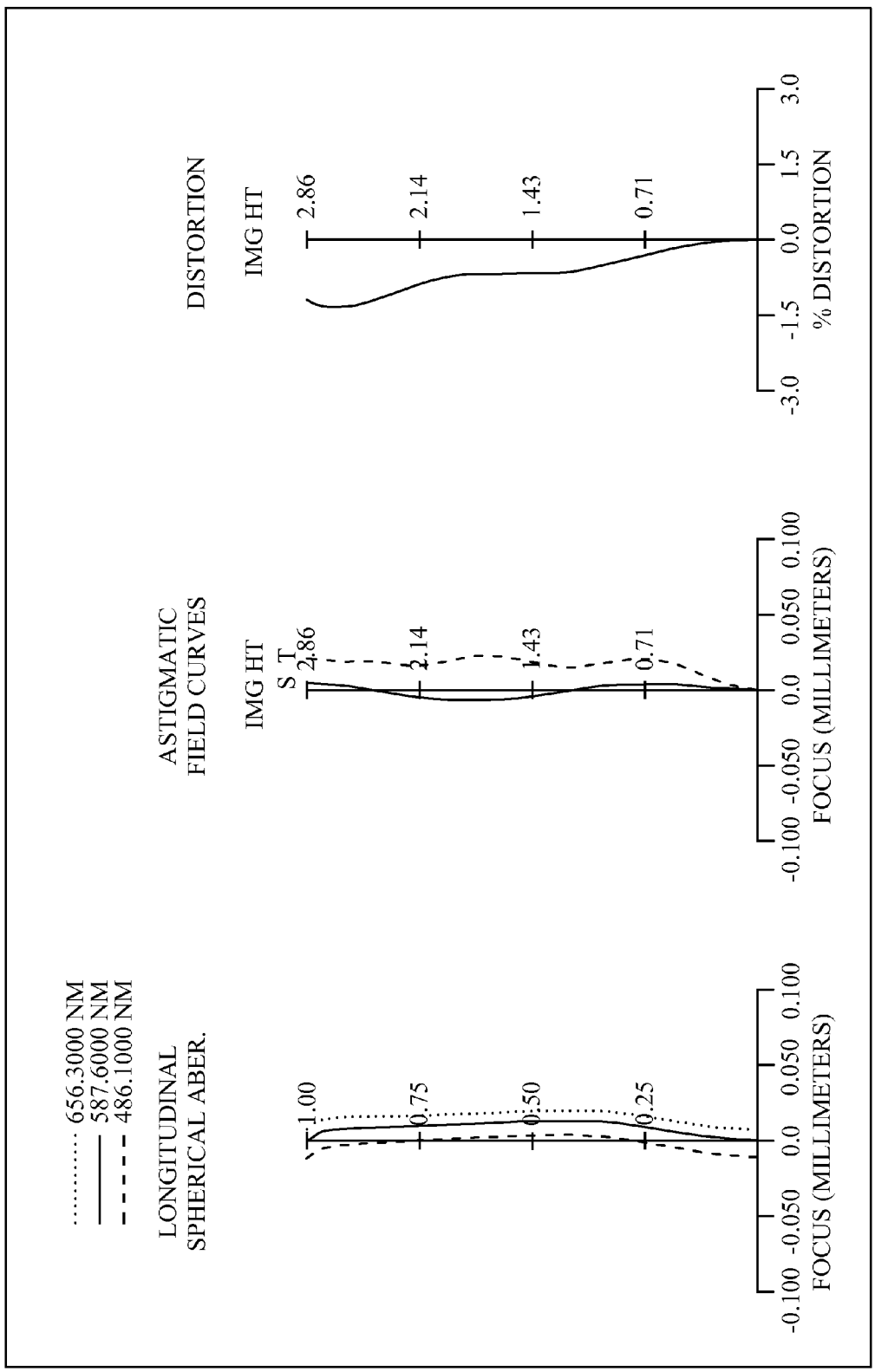
FIG. 6B is a schematic view of a series of aberration curves of the sixth preferred embodiment of the present invention.

With reference to FIGS. 6A and 6B for a schematic view and a series of aberration curves of an optical image lens assembly in accordance with the sixth preferred embodiment of the present invention respectively, the optical imaging lens assembly comprises five non-cemented lenses with refractive power, an aperture stop 600 and an IR-filter 660. More specifically, the optical imaging lens assembly, sequentially arranged from an object side to an image side along an optical axis, comprises: a plastic first lens element 610 with positive refractive power, having a convex object-side surface 611 and a concave image-side surface 612, and both object-side surface 611 and image-side surface 612 thereof being aspheric; an aperture stop 600; a plastic second lens element 620 with negative refractive power, having a convex object-side surface 621 and a concave image-side surface 622, and both object-side surface 621 and image-side surface 622 thereof being aspheric; a plastic third lens element 630 with negative refractive power, having a concave object-side surface 631 and a convex image-side surface 632, and both object-side surface 631 and image-side surface 632 being aspheric; a plastic fourth lens element 640 with positive refractive power, having a concave object-side surface 641 and a convex image-side surface 642, and both object-side surface 641 and image-side surface 642 being aspheric; a plastic fifth lens element 650 with negative refractive power, having a concave object-side surface 651 and a convex image-side surface 652, and both object-side surface 651 and image-side surface 652 thereof being aspheric, and at least one of the object-side surface 651 and image-side surface 652 thereof having at least one inflection point; a glass IR-filter 660, made of panel glass for adjusting a wavelength section of the light of an image; and an image sensor 680 installed at an image plane 670. With the combination of the five lens elements, the aperture stop 600 and the IR-filter 660, an image of the object to be photographed can be formed at the image sensor 680.

TABLE 16

Optical data of this preferred embodiment
f = 4.52 mm, Fno = 2.45, HFOV = 32.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.622300 (ASP) | 0.761 | Plastic | 1.544 | 55.9 | 3.21 |
| 2 | | 19.193900 (ASP) | 0.074 | | | | |
| 3 | Ape. Stop | Plano | 0.022 | | | | |
| 4 | Lens 2 | 7.294400 (ASP) | 0.272 | Plastic | 1.634 | 23.8 | −5.74 |
| 5 | | 2.393730 (ASP) | 0.541 | | | | |
| 6 | Lens 3 | −7.962000 (ASP) | 0.315 | Plastic | 1.634 | 23.8 | −14.01 |
| 7 | | −78.153000 (ASP) | 0.265 | | | | |
| 8 | Lens 4 | −22.202900 (ASP) | 0.979 | Plastic | 1.544 | 55.9 | 2.32 |
| 9 | | −1.212880 (ASP) | 0.588 | | | | |
| 10 | Lens 5 | −1.150240 (ASP) | 0.335 | Plastic | 1.544 | 55.9 | −2.36 |
| 11 | | −11.947400 (ASP) | 0.600 | | | | |
| 12 | IR-filter | Plano | 0.300 | Glass | 1.517 | 64.2 | |
| 13 | | Plano | 0.332 | | | | |
| 14 | Image | Plano | — | | | | |

Note:
Reference wavelength is 587.6 nm.

ASP stands for aspherical surfaces.

The optical data of this preferred embodiment are listed in Table 16, wherein the object-side surface and the image-side surface of the first lens element 610 to the fifth lens element 650 comply with the aspheric surface formula as given in Equation (14), and their aspheric coefficients are listed in Table 17 as follows:

TABLE 17

Aspheric coefficients of this preferred embodiment

| Surface # | 1 | 2 | 4 | 5 | 6 |
|---|---|---|---|---|---|
| k = | −6.16641E−01 | −1.00000E+00 | −4.00000E+01 | −1.00000E+00 | −3.08479E+01 |
| A4 = | 2.09194E−02 | −2.82463E−02 | −8.44754E−02 | −5.66286E−02 | −2.19555E−01 |
| A6 = | 2.57408E−02 | 5.82004E−02 | 1.35747E−01 | 9.98658E−02 | 3.27024E−02 |
| A8 = | −3.76497E−02 | −5.55134E−03 | −8.27094E−02 | −9.26200E−03 | −9.91244E−02 |
| A10 = | 5.21943E−02 | −7.12587E−02 | 3.91735E−02 | −7.27534E−02 | 4.32878E−02 |
| A12 = | −3.18382E−02 | 8.13985E−02 | −9.45931E−02 | 6.97965E−02 | 1.48318E−02 |
| A14 = | 8.79930E−03 | −2.98052E−02 | 8.44375E−02 | −5.02081E−04 | 2.50102E−04 |

| Surface # | 7 | 8 | 9 | 10 | 11 |
|---|---|---|---|---|---|
| k = | −1.00000E+00 | 9.64855E+01 | −7.35385E−01 | −1.60695E+00 | −1.00000E+00 |
| A4 = | −2.08737E−01 | −1.03421E−01 | 5.23187E−02 | 1.16650E−01 | 2.95461E−02 |
| A6 = | 1.09074E−01 | 6.41224E−02 | −1.84533E−02 | −4.28065E−02 | −1.49827E−02 |
| A8 = | −1.06581E−01 | 1.06051E−02 | 3.26842E−02 | 7.43240E−03 | 1.90029E−03 |
| A10 = | 6.97418E−02 | −1.93391E−02 | −1.12445E−02 | −6.83192E−04 | 1.11980E−05 |
| A12 = | −1.68393E−02 | 6.34895E−03 | 1.22385E−03 | 5.58375E−05 | −2.10342E−05 |
| A14 = | 2.57519E−03 | −7.79704E−04 | −2.45747E−05 | −2.93506E−06 | −1.78156E−06 |
| A16 = | | | | 1.23844E−08 | 4.82490E−07 |

With reference to Table 16 and FIG. 6B for an optical imaging lens assembly of this preferred embodiment, the optical imaging lens assembly has a focal length f=4.52 (mm), an overall aperture value (f-number) Fno=2.45, and a half of maximum view angle HFOV=32.6°. After the optical data of this preferred embodiment are calculated and derived, the optical imaging lens assembly satisfies related conditions as shown in Table 18 below, and the related symbols have been described above and thus will not be described again.

TABLE 18

Data of related relations of this preferred embodiment

| Relation | Data |
|---|---|
| $R_8/R_9$ | 1.05 |
| $v_1 - v_2$ | 32.1 |
| $v_1 - (v_2 + v_3)$ | 8.3 |
| $R_9/f$ | −0.26 |
| $(R_7 + R_8)/(R_7 - R_8)$ | 1.12 |
| $(R_9 + R_{10})/(R_9 - R_{10})$ | −1.21 |
| $T_{45}/f$ | 0.13 |
| $f/f_5$ | −1.92 |
| $f/f_4$ | 1.95 |
| $S_D/T_D$ | 0.80 |
| TTL/ImgH | 1.85 |

According to the optical data as shown in Table 16 and the aberration curves as shown in FIG. 6B, the optical imaging lens assembly in accordance with this preferred embodiment of the present invention provides good correction results in aspects of the longitudinal spherical aberration, astigmatic field curving, and distortion.

<Seventh Preferred Embodiment>

Figure 7A:
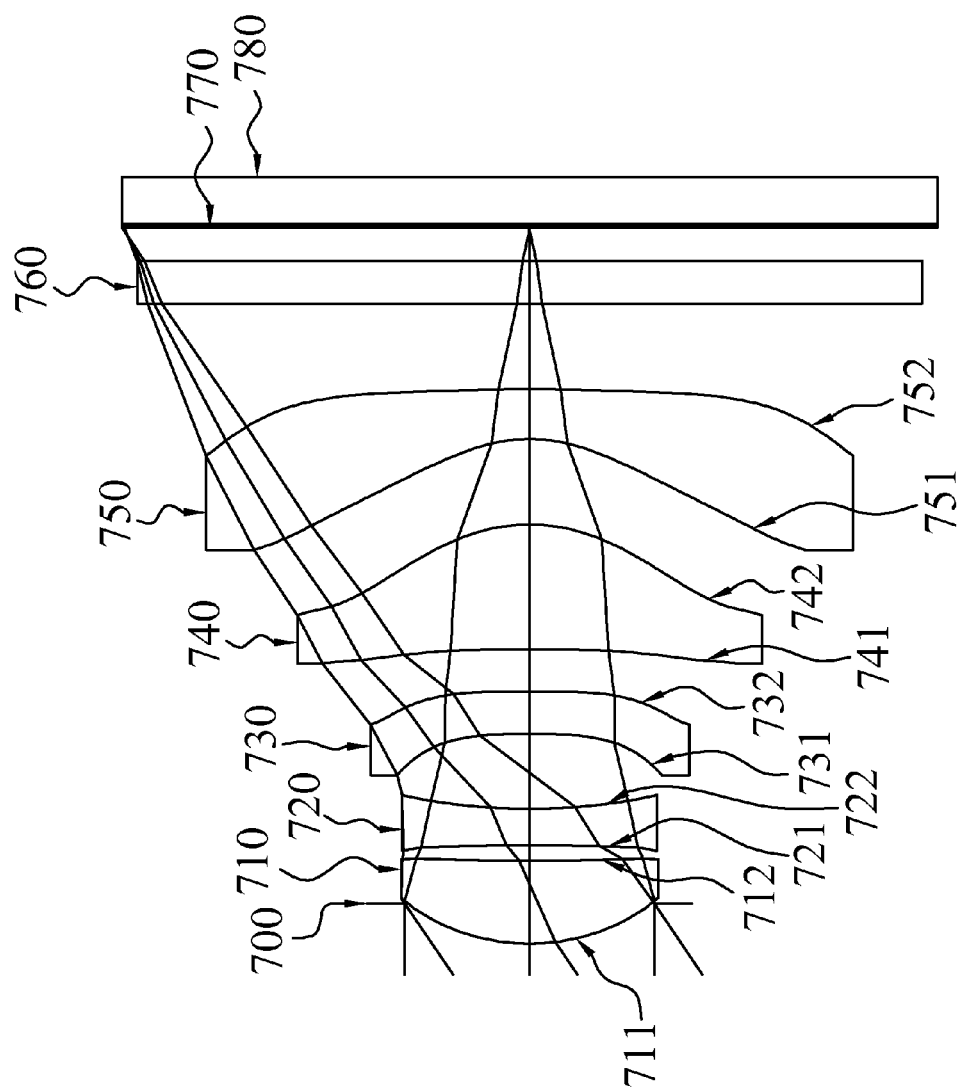
FIG. 7A is a schematic view of an optical lens in accordance with the seventh preferred embodiment of the present invention.
Figure 7B:
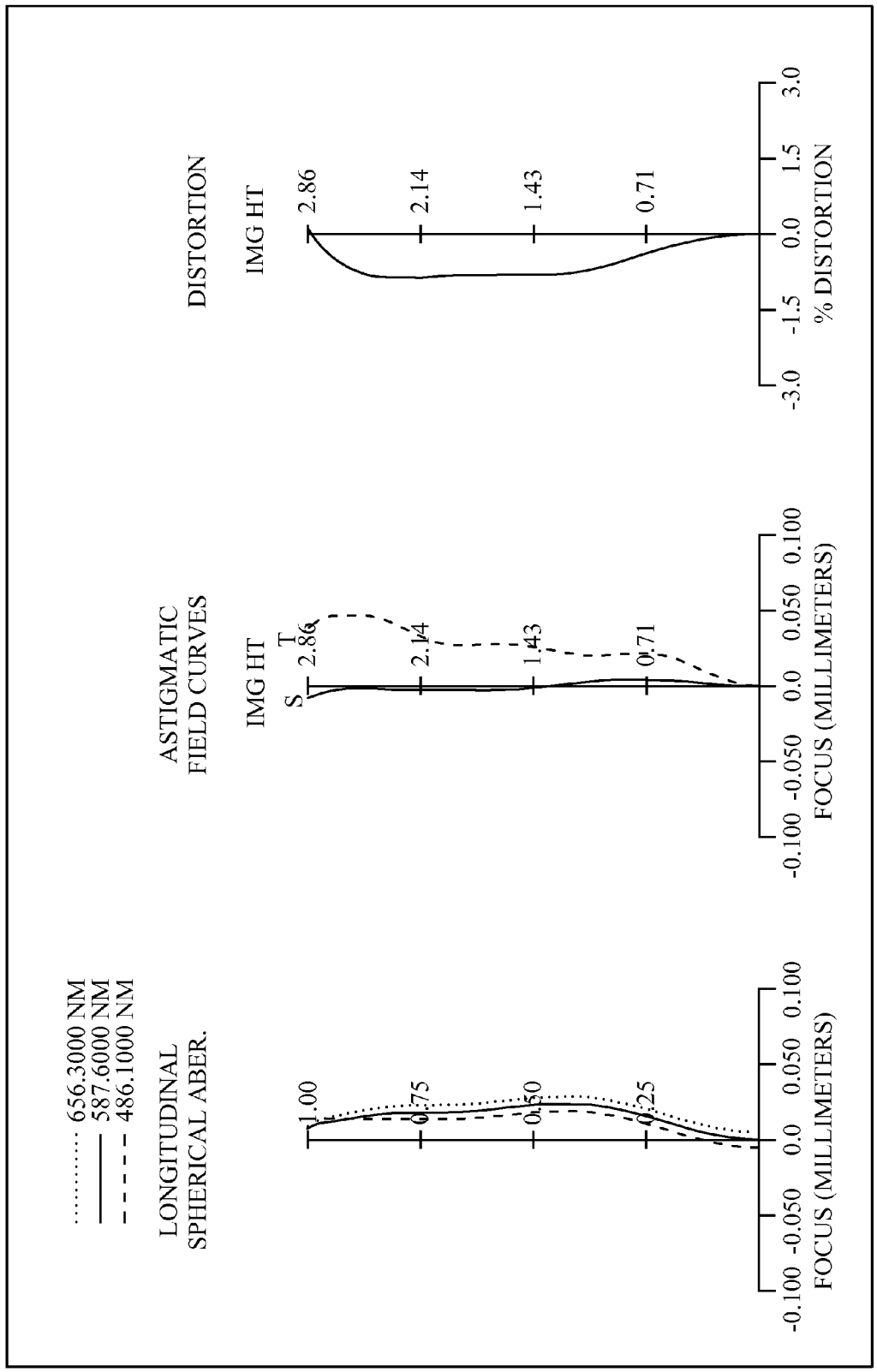
FIG. 7B is a schematic view of a series of aberration curves of the seventh preferred embodiment of the present invention.

With reference to FIGS. 7A and 7B for a schematic view and a series of aberration curves of an optical image lens assembly in accordance with the seventh preferred embodiment of the present invention respectively, the optical imaging lens assembly comprises five non-cemented lenses with refractive power, an aperture stop 700 and an IR-filter 760. More specifically, the optical imaging lens assembly, sequentially arranged from an object side to an image side along an optical axis, comprises: an aperture stop 700; a plastic first lens element 710 with positive refractive power, having a convex object-side surface 711 and a concave image-side surface 712, and both object-side surface 711 and image-side surface 712 thereof being aspheric; a plastic second lens element 720 with negative refractive power, having a concave object-side surface 721 and a concave image-side surface 722, and both object-side surface 721 and image-side surface 722 thereof being aspheric; a plastic third lens element 730 with negative refractive power, having a concave object-side surface 731 and a convex image-side surface 732, and both object-side surface 731 and image-side surface 732 being aspheric; a plastic fourth lens element 740 with positive refractive power, having a concave object-side surface 741 and a convex image-side surface 742, and both object-side surface 741 and image-side surface 742 being aspheric; a plastic fifth lens element 750 with negative refractive power, having a concave object-side surface 751 and a convex image-side surface 752, and both object-side surface 751 and image-side surface 752 thereof being aspheric, and at least one of the object-side surface 751 and image-side surface 752 thereof having at least one inflection point; a glass IR-filter 760, made of panel glass for adjusting a wavelength section of the light of an image; and an image sensor 780 installed at an image plane 770. With the combination of the five lens elements, the aperture stop 700 and the IR-filter 760, an image of the object to be photographed can be formed at the image sensor 780.

TABLE 19

Optical data of this preferred embodiment
f = 4.20 mm, Fno = 2.40, HFOV = 34.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.280 | | | | |
| 2 | Lens 1 | 1.505740 (ASP) | 0.582 | Plastic | 1.544 | 55.9 | 2.93 |
| 3 | | 24.096400 (ASP) | 0.109 | | | | |
| 4 | Lens 2 | −18.532300 (ASP) | 0.258 | Plastic | 1.634 | 23.8 | −6.19 |
| 5 | | 5.002600 (ASP) | 0.527 | | | | |
| 6 | Lens 3 | −5.066300 (ASP) | 0.296 | Plastic | 1.634 | 23.8 | −9.07 |
| 7 | | −43.478300 (ASP) | 0.294 | | | | |
| 8 | Lens 4 | −168.891600 (ASP) | 0.878 | Plastic | 1.544 | 55.9 | 2.20 |
| 9 | | −1.189250 (ASP) | 0.600 | | | | |
| 10 | Lens 5 | −1.058970 (ASP) | 0.352 | Plastic | 1.544 | 55.9 | −2.17 |
| 11 | | −11.454800 (ASP) | 0.600 | | | | |
| 12 | IR-filter | Plano | 0.300 | Glass | 1.517 | 64.2 | |
| 13 | | Plano | 0.234 | | | | |
| 14 | Image | Plano | — | | | | |

Note:
Reference wavelength is 587.6 nm.
ASP stands for aspherical surfaces.

The optical data of this preferred embodiment are listed in Table 19, wherein the object-side surface and the image-side surface of the first lens element 710 to the fifth lens element 750 comply with the aspheric surface formula as given in Equation (14), and their aspheric coefficients are listed in Table 20 as follows:

TABLE 20

Aspheric coefficients of this preferred embodiment

| Surface # | 2 | 3 | 4 | 5 | 6 |
|---|---|---|---|---|---|
| k = | −4.69360E−01 | −1.00000E+00 | 3.00000E+00 | −1.00000E+00 | −1.04289E+01 |
| A4 = | 2.48853E−02 | 1.69853E−02 | 7.74706E−03 | 2.35454E−02 | −2.65798E−01 |
| A6 = | 4.08792E−02 | −1.80144E−02 | 2.86908E−02 | 1.16717E−02 | 3.40106E−02 |
| A8 = | −3.79010E−02 | 8.85295E−02 | −7.51977E−02 | 9.37992E−03 | −1.06362E−01 |
| A10 = | 4.11034E−02 | −1.17837E−01 | 2.07031E−02 | −6.69673E−02 | 3.44400E−02 |
| A12 = | 1.67658E−02 | −6.44208E−02 | −1.19308E−01 | −2.93589E−02 | −4.71228E−04 |
| A14 = | −2.82099E−02 | 3.89946E−02 | 5.95103E−02 | 9.29812E−02 | 1.08030E−02 |

| Surface # | 7 | 8 | 9 | 10 | 11 |
|---|---|---|---|---|---|
| k = | −1.00000E+00 | −1.00000E+00 | −7.74878E−01 | −1.62472E+00 | −1.00000E+00 |
| A4 = | −2.30672E−01 | −9.92656E−02 | 5.10610E−02 | 1.17135E−01 | 2.99395E−02 |
| A6 = | 8.97416E−02 | 4.67196E−02 | −1.44127E−02 | −4.48627E−02 | −1.66520E−02 |
| A8 = | −7.58480E−02 | 1.34449E−02 | 3.48387E−02 | 7.79041E−03 | 2.30890E−03 |
| A10 = | 5.60688E−02 | −1.71060E−02 | −1.17268E−02 | −5.61845E−04 | 1.00768E−06 |
| A12 = | −2.76063E−02 | 6.39548E−03 | 1.10625E−03 | 6.85778E−05 | −2.74264E−05 |
| A14 = | 1.76742E−02 | −1.09595E−03 | −3.19965E−05 | −4.58590E−06 | −2.08896E−06 |
| A16 = | | | | −1.09314E−06 | 6.45068E−07 |

With reference to Table 19 and FIG. 7B for an optical imaging lens assembly of this preferred embodiment, the optical imaging lens assembly has a focal length f=4.20 (mm), an overall aperture value (f-number) Fno=2.40, and a half of maximum view angle HFOV=34.1°. After the optical data of this preferred embodiment are calculated and derived, the optical imaging lens assembly satisfies related conditions as shown in Table 21 below, and the related symbols have been described above and thus will not be described again.

TABLE 21

Data of related relations of this preferred embodiment

| Relation | Data |
|---|---|
| $R_8/R_9$ | 1.12 |
| $v_1 - v_2$ | 32.1 |
| $v_1 - (v_2 + v_3)$ | 8.3 |
| $R_9/f$ | −0.25 |
| $(R_7 + R_8)/(R_7 - R_8)$ | 1.01 |
| $(R_9 + R_{10})/(R_9 - R_{10})$ | −1.20 |
| $T_{45}/f$ | 0.14 |
| $f/f_5$ | −1.94 |
| $f/f_4$ | 1.91 |
| $S_D/T_D$ | 0.93 |
| TTL/ImgH | 1.73 |

According to the optical data as shown in Table 19 and the aberration curves as shown in FIG. 7B, the optical imaging lens assembly in accordance with this preferred embodiment of the present invention provides good correction results in aspects of the longitudinal spherical aberration, astigmatic field curving, and distortion.

<Eighth Preferred Embodiment>

Figure 8A:
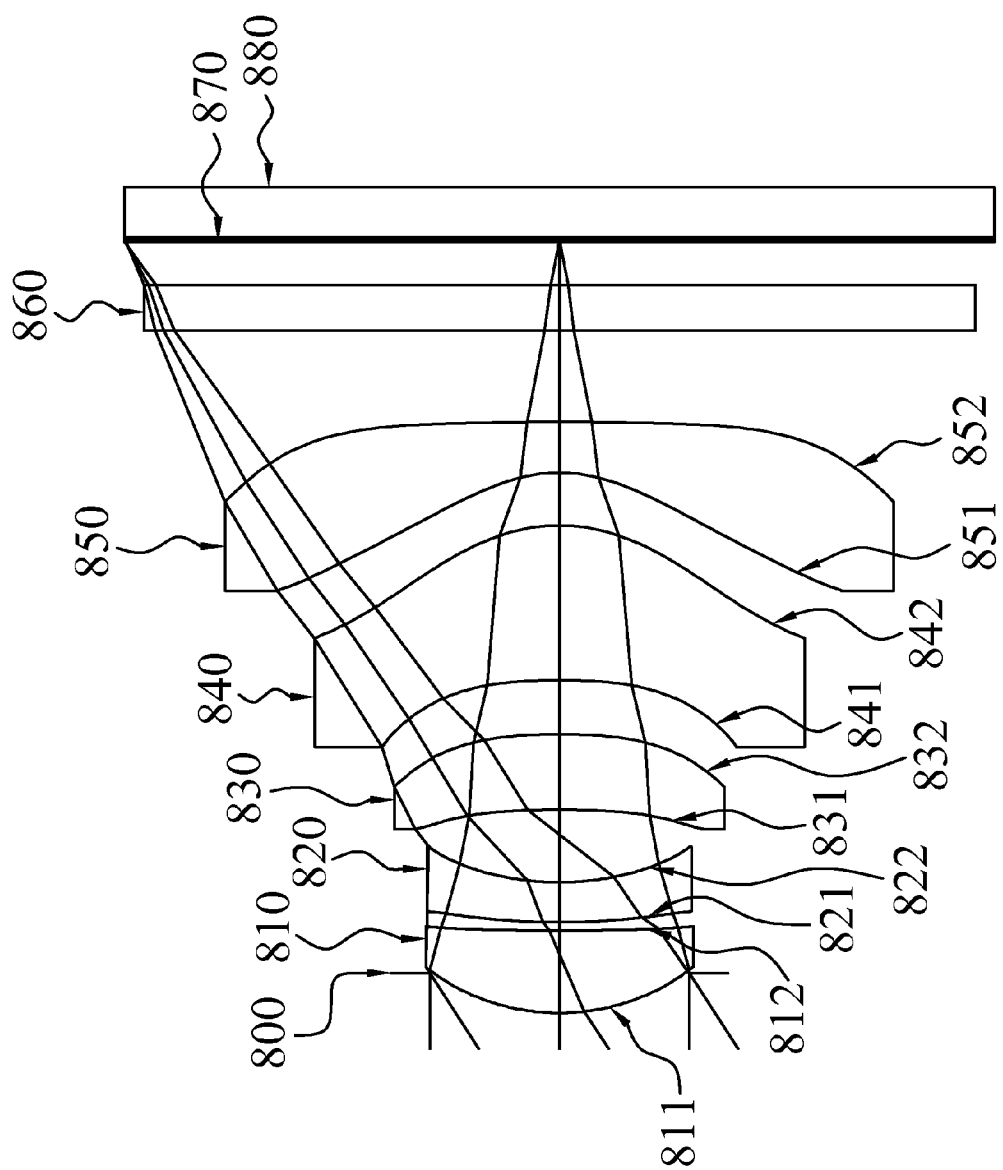
FIG. 8A is a schematic view of an optical lens in accordance with the eighth preferred embodiment of the present invention.
Figure 8B:
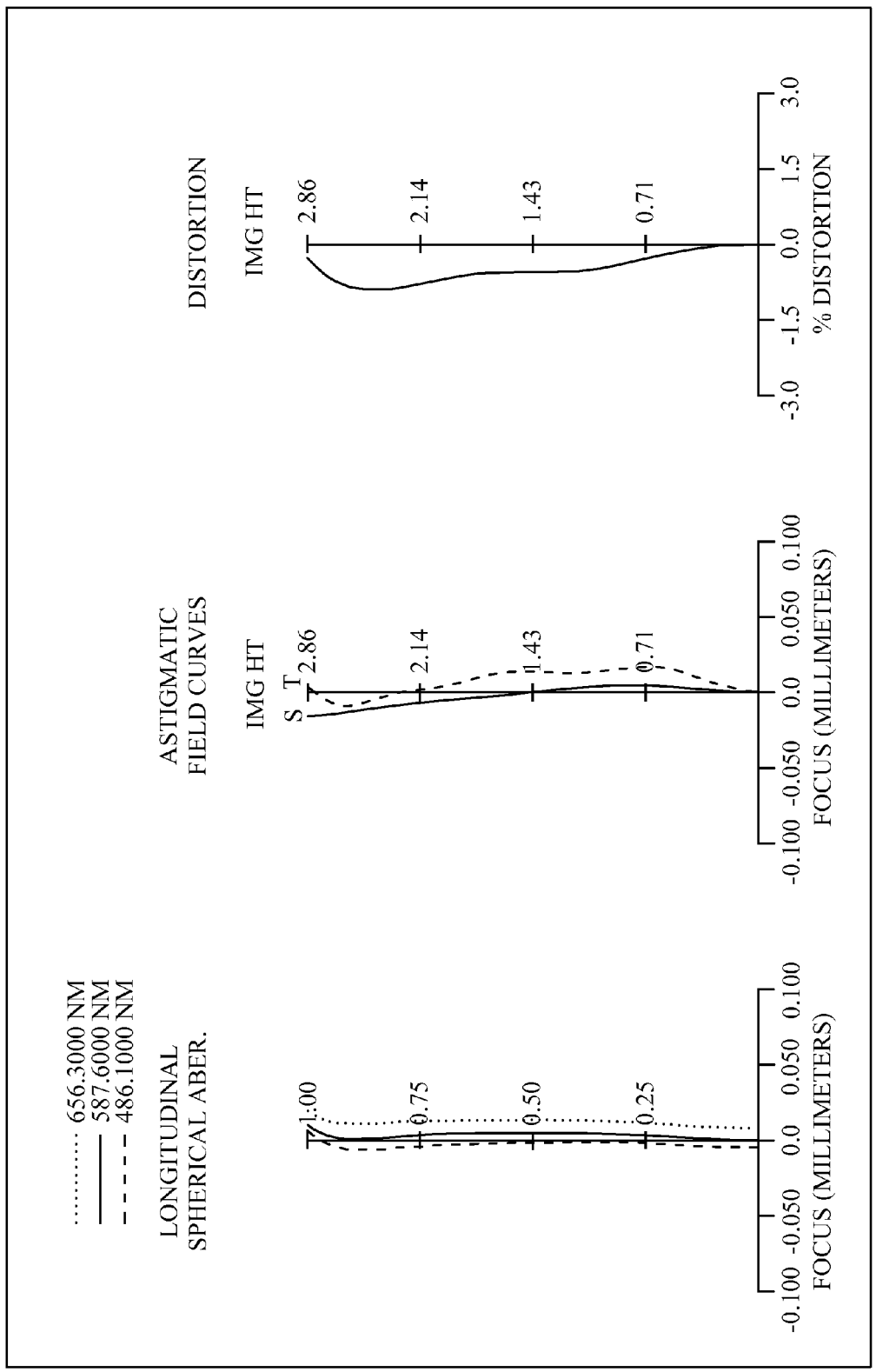
FIG. 8B is a schematic view of a series of aberration curves of the eighth preferred embodiment of the present invention.

With reference to FIGS. 8A and 8B for a schematic view and a series of aberration curves of an optical image lens assembly in accordance with the eighth preferred embodiment of the present invention respectively, the optical imaging lens assembly comprises five non-cemented lenses with refractive power, an aperture stop 800 and an IR-filter 860. More specifically, the optical imaging lens assembly, sequentially arranged from an object side to an image side along an optical axis, comprises: an aperture stop 800; a plastic first lens element 810 with positive refractive power, having a convex object-side surface 811 and a concave image-side surface 812, and both object-side surface 811 and image-side surface 812 thereof being aspheric; a plastic second lens element 820 with negative refractive power, having a convex object-side surface 821 and a concave image-side surface 822, and both object-side surface 821 and image-side surface 822 thereof being aspheric; a plastic third lens element 830 with positive refractive power, having a concave object-side surface 831 and a convex image-side surface 832, and both object-side surface 831 and image-side surface 832 being aspheric; a plastic fourth lens element 840 with positive refractive power, having a concave object-side surface 841 and a convex image-side surface 842, and both object-side surface 841 and image-side surface 842 being aspheric; a plastic fifth lens element 850 with negative refractive power, having a concave object-side surface 851 and a convex image-side surface 852, and both object-side surface 851 and image-side surface 852 thereof being aspheric, and at least one of the object-side surface 851 and image-side surface 852 thereof having at least one inflection point; a glass IR-filter 860, made of panel glass for adjusting a wavelength section of the light of an image; and an image sensor 880 installed at an image plane 870. With the combination of the five lens elements, the aperture stop 800 and the IR-filter 860, an image of the object to be photographed can be formed at the image sensor 880.

TABLE 24

Optical data of this preferred embodiment
f = 4.43 mm, Fno = 2.60, HFOV = 32.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.261 | | | | |
| 2 | Lens 1 | 1.480920 (ASP) | 0.544 | Plastic | 1.544 | 55.9 | 2.77 |
| 3 | | 81.272200 (ASP) | 0.053 | | | | |

TABLE 24-continued

Optical data of this preferred embodiment
f = 4.43 mm, Fno = 2.60, HFOV = 32.9 deg.

| Surface # | | Curvature Radius | Thickness | Material | Index | Abbe # | Focal Length |
|---|---|---|---|---|---|---|---|
| 4 | Lens 2 | 5.048300 (ASP) | 0.263 | Plastic | 1.650 | 21.4 | −5.09 |
| 5 | | 1.957960 (ASP) | 0.477 | | | | |
| 6 | Lens 3 | −6.167500 (ASP) | 0.497 | Plastic | 1.544 | 55.9 | 16.64 |
| 7 | | −3.773200 (ASP) | 0.355 | | | | |
| 8 | Lens 4 | −4.116500 (ASP) | 1.018 | Plastic | 1.544 | 55.9 | 2.47 |
| 9 | | −1.099870 (ASP) | 0.347 | | | | |
| 10 | Lens 5 | −0.961790 (ASP) | 0.335 | Plastic | 1.544 | 55.9 | −1.89 |
| 11 | | −17.211700 (ASP) | 0.600 | | | | |
| 12 | IR-filter | Plano | 0.300 | Glass | 1.517 | 64.2 | |
| 13 | | Plano | 0.286 | | | | |
| 14 | Image | Plano | — | | | | |

Note:
Reference wavelength is 587.6 nm.
ASP stands for aspherical surfaces.

The optical data of this preferred embodiment are listed in Table 24, wherein the object-side surface and the image-side surface of the first lens element 810 to the fifth lens element 850 comply with the aspheric surface formula as given in Equation (14), and their aspheric coefficients are listed in Table 25 as follows:

TABLE 25

Aspheric coefficients of this preferred embodiment

| Surface # | 2 | 3 | 4 | 5 | 6 |
|---|---|---|---|---|---|
| k = | −4.79847E−01 | 0.00000E+00 | −5.00000E+00 | −1.28734E+00 | −5.00000E+00 |
| A4 = | 2.68970E−02 | 4.28222E−02 | 7.93145E−03 | 2.31891E−02 | −1.03610E−01 |
| A6 = | 2.12348E−02 | −1.24274E−02 | 1.73523E−02 | 6.58890E−02 | 5.14651E−02 |
| A8 = | −1.35494E−02 | 3.15467E−02 | −2.53967E−02 | 2.38277E−02 | −1.23470E−01 |
| A10 = | 4.29630E−02 | −4.50252E−02 | 5.24752E−02 | −4.81567E−03 | 8.45489E−02 |
| A12 = | −3.08309E−02 | 1.79904E−02 | −1.13257E−01 | 1.75175E−02 | 1.24324E−02 |
| A14 = | 1.47229E−02 | −1.63474E−02 | 1.56180E−02 | 1.20738E−03 | 3.12046E−02 |

| Surface # | 7 | 8 | 9 | 10 | 11 |
|---|---|---|---|---|---|
| k = | −3.68087E+00 | 1.00645E+01 | −7.98743E−01 | −1.58165E+00 | −1.00000E+00 |
| A4 = | −1.51522E−01 | −1.51042E−01 | 6.84111E−02 | 1.21321E−01 | 1.66915E−02 |
| A6 = | 4.70183E−02 | 4.63751E−02 | −1.71058E−02 | −4.27485E−02 | −1.50486E−02 |
| A8 = | −8.12518E−02 | −1.21211E−03 | 3.25058E−02 | 7.52027E−03 | 2.34732E−03 |
| A10 = | 5.53698E−02 | −1.20053E−02 | −1.23175E−02 | −6.43800E−04 | −1.79566E−05 |
| A12 = | −3.26902E−02 | 1.10281E−02 | 1.07314E−03 | 5.80897E−05 | −3.22185E−05 |
| A14 = | 1.64786E−02 | −4.95565E−03 | 1.10610E−04 | −4.05881E−06 | −2.36412E−06 |
| A16 = | | | | −4.29490E−08 | 8.19756E−07 |

With reference to Table 24 and FIG. 8B for an optical imaging lens assembly of this preferred embodiment, the optical imaging lens assembly has a focal length f=4.43 (mm), an overall aperture value (f-number) Fno=2.60, and a half of maximum view angle HFOV=32.9°. After the optical data of this preferred embodiment are calculated and derived, the optical imaging lens assembly satisfies related conditions as shown in Table 26 below, and the related symbols have been described above and thus will not be described again.

TABLE 26

Data of related relations of this preferred embodiment

| Relation | Data |
|---|---|
| $R_8/R_9$ | 1.14 |
| $v_1 - v_2$ | 34.5 |
| $v_1 - (v_2 + v_3)$ | −21.4 |

TABLE 26-continued

Data of related relations of this preferred embodiment

| Relation | Data |
|---|---|
| $R_9/f$ | −0.22 |
| $(R_7 + R_8)/(R_7 - R_8)$ | 1.73 |
| $(R_9 + R_{10})/(R_9 - R_{10})$ | −1.12 |
| $T_{45}/f$ | 0.08 |
| $f/f_5$ | −2.34 |
| $f/f_4$ | 1.79 |
| $S_D/T_D$ | 0.93 |
| TTL/ImgH | 1.74 |

According to the optical data as shown in Table 24 and the aberration curves as shown in FIG. 8B, the optical imaging lens assembly in accordance with this preferred embodiment <Ninth Preferred Embodiment>

Figure 9A:
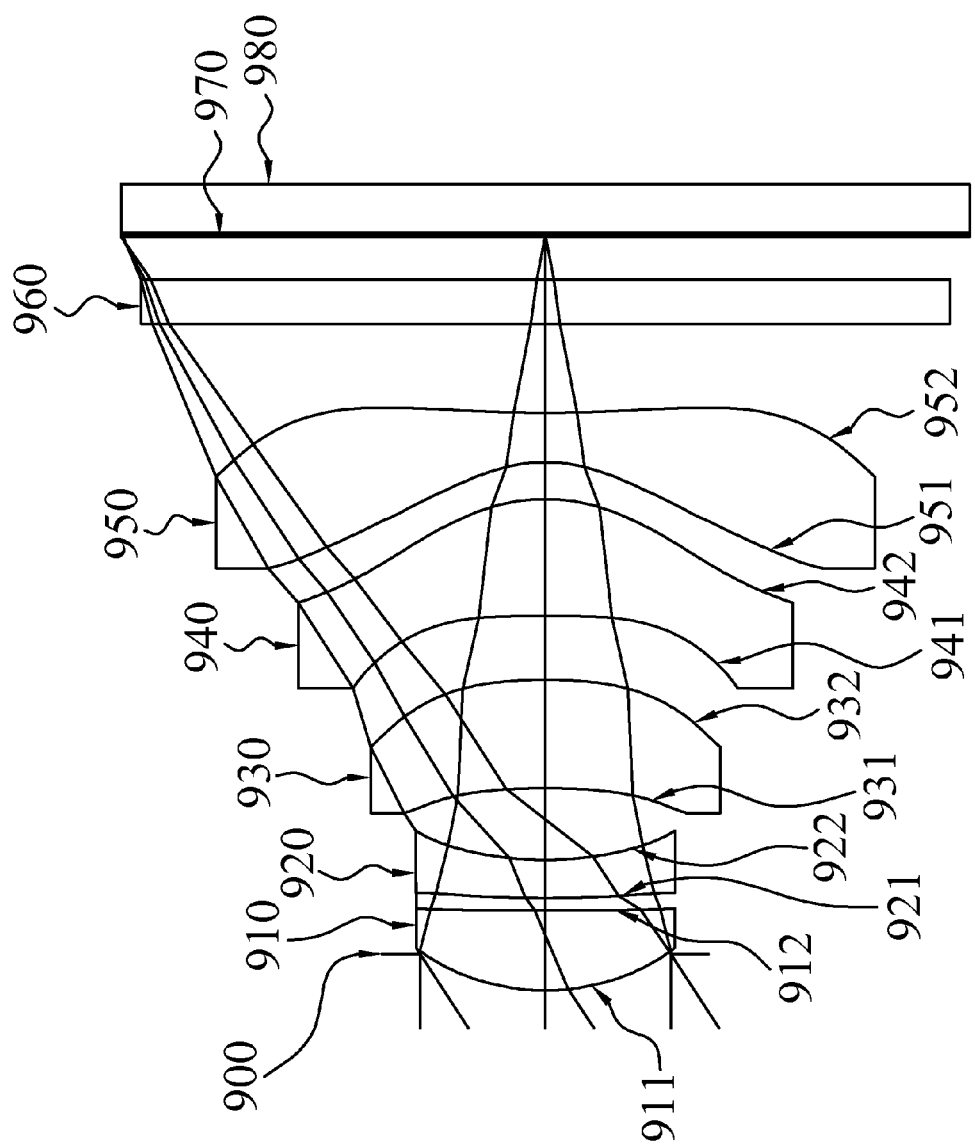
FIG. 9A is a schematic view of an optical lens in accordance with the ninth preferred embodiment of the present invention.
Figure 9B:
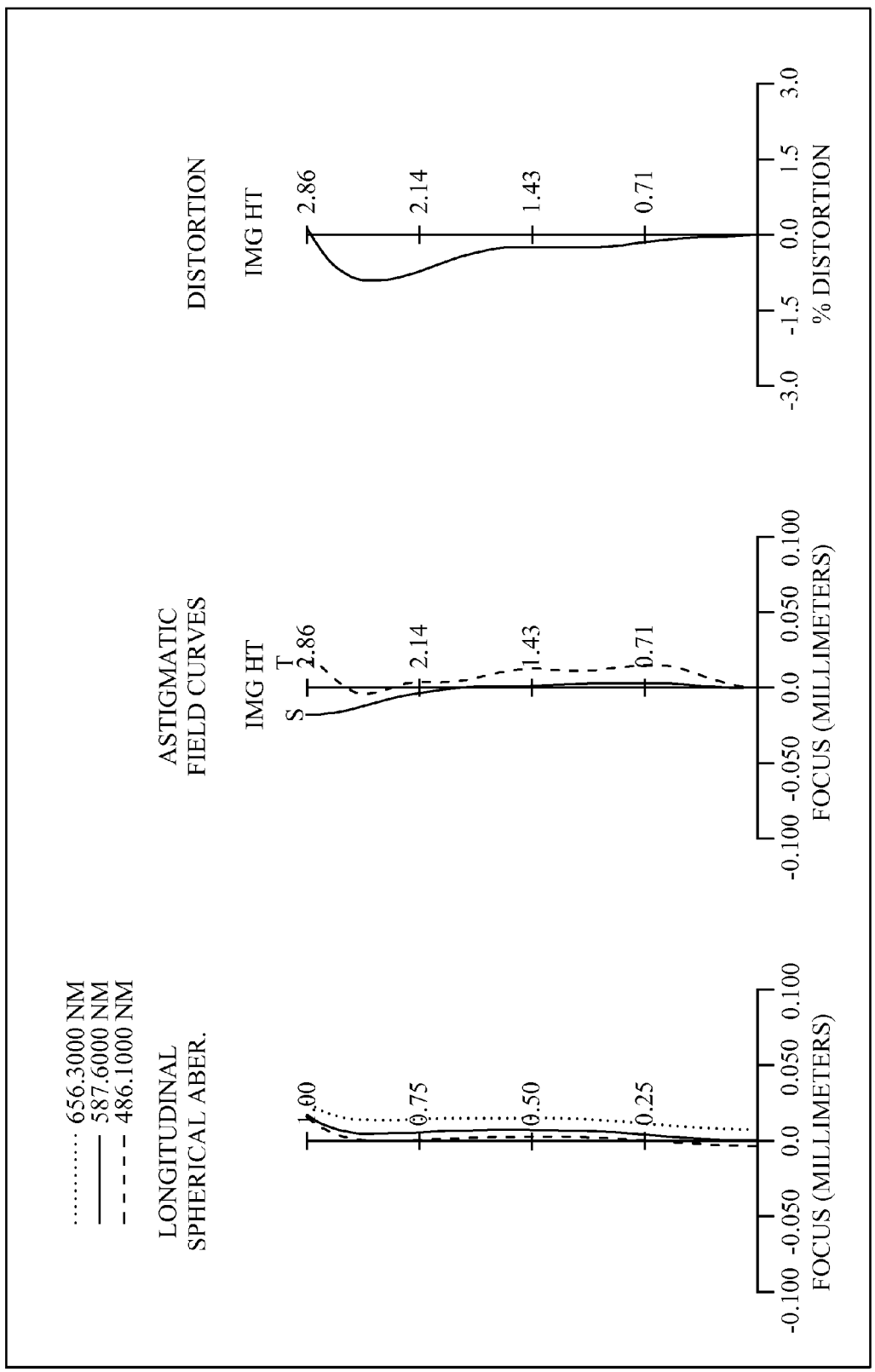
FIG. 9B is a schematic view of a series of aberration curves of the ninth preferred embodiment of the present invention.

With reference to FIGS. 9A and 9B for a schematic view and a series of aberration curves of an optical image lens assembly in accordance with the ninth preferred embodiment of the present invention respectively, the optical imaging lens assembly comprises five non-cemented lenses with refractive power, an aperture stop 900 and an IR-filter 960. More specifically, the optical imaging lens assembly, sequentially arranged from an object side to an image side along an optical axis, comprises: an aperture stop 900; a plastic first lens element 910 with positive refractive power, having a convex object-side surface 911 and a convex image-side surface 912, and both object-side surface 911 and image-side surface 912 thereof being aspheric; a plastic second lens element 920 with negative refractive power, having a convex object-side surface 921 and a concave image-side surface 922, and both object-side surface 921 and image-side surface 922 thereof being aspheric; a plastic third lens element 930 with positive refractive power, having a concave object-side surface 931 and a convex image-side surface 932, and both object-side surface 931 and image-side surface 932 being aspheric; a plastic fourth lens element 940 with positive refractive power, having a concave object-side surface 941 and a convex image-side surface 942, and both object-side surface 941 and image-side surface 942 being aspheric; a plastic fifth lens element 950 with negative refractive power, having a concave object-side surface 951 and a concave image-side surface 952, and both object-side surface 951 and image-side surface 952 thereof being aspheric, and at least one of the object-side surface 951 and image-side surface 952 thereof having at least one inflection point; a glass IR-filter 960, made of panel glass for adjusting a wavelength section of the light of an image; and an image sensor 980 installed at an image plane 970. With the combination of the five lens elements, the aperture stop 900 and the IR-filter 960, an image of the object to be photographed can be formed at the image sensor 980.

TABLE 27

Optical data of this preferred embodiment
f = 4.36 mm, Fno = 2.58, HFOV = 33.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.245 | | | | |
| 2 | Lens 1 | 1.537140 (ASP) | 0.541 | Plastic | 1.544 | 55.9 | 2.78 |
| 3 | | −93.321600 (ASP) | 0.083 | | | | |
| 4 | Lens 2 | 8.475600 (ASP) | 0.258 | Plastic | 1.650 | 21.4 | −5.22 |
| 5 | | 2.392310 (ASP) | 0.483 | | | | |
| 6 | Lens 3 | −4.601700 (ASP) | 0.732 | Plastic | 1.544 | 55.9 | 16.40 |
| 7 | | −3.206100 (ASP) | 0.430 | | | | |
| 8 | Lens 4 | −16.603400 (ASP) | 0.788 | Plastic | 1.544 | 55.9 | 2.28 |
| 9 | | −1.173230 (ASP) | 0.249 | | | | |
| 10 | Lens 5 | −1.008210 (ASP) | 0.335 | Plastic | 1.544 | 55.9 | −1.65 |
| 11 | | 9.345800 (ASP) | 0.600 | | | | |
| 12 | IR-filter | Plano | 0.300 | Glass | 1.517 | 64.2 | |
| 13 | | Plano | 0.286 | | | | |
| 14 | Image | Plano | — | | | | |

Note:
Reference wavelength is 587.6 nm.
ASP stands for aspherical surfaces.

The optical data of this preferred embodiment are listed in Table 27, wherein the object-side surface and the image-side surface of the first lens element 910 to the fifth lens element 950 comply with the aspheric surface formula as given in Equation (14), and their aspheric coefficients are listed in Table 28 as follows:

TABLE 28

Aspheric coefficients of this preferred embodiment

| Surface # | 2 | 3 | 4 | 5 | 6 |
|---|---|---|---|---|---|
| k = | −4.70073E−01 | 1.00000E+02 | −5.00000E+00 | −1.94574E+00 | 4.61178E−01 |
| A4 = | 2.75624E−02 | 3.74869E−02 | −2.60359E−03 | 1.47472E−02 | −1.05959E−01 |
| A6 = | 1.97564E−02 | −1.64857E−02 | 8.22007E−03 | 4.64604E−02 | 4.09340E−02 |
| A8 = | −8.31019E−03 | 3.42619E−02 | −2.11831E−02 | 2.04546E−02 | −1.30248E−01 |
| A10 = | 3.60011E−02 | −4.74857E−02 | 6.05183E−02 | 3.73003E−03 | 8.65006E−02 |
| A12 = | −3.08206E−02 | 1.79904E−02 | −1.13257E−01 | 1.75175E−02 | 1.24392E−02 |
| A14 = | 1.47229E−02 | −1.63474E−02 | 1.56180E−02 | 1.20738E−03 | 3.12046E−02 |

| Surface # | 7 | 8 | 9 | 10 | 11 |
|---|---|---|---|---|---|
| k = | −1.69932E+00 | 7.30718E+01 | −7.87674E−01 | −1.65264E+00 | −1.00000E+00 |
| A4 = | −1.55872E−01 | −1.94245E−01 | 6.59688E−02 | 1.19636E−01 | −1.09722E−02 |
| A6 = | 5.25804E−02 | 2.90886E−02 | −1.80552E−02 | −4.26393E−02 | −1.04576E−02 |

TABLE 28-continued

| Aspheric coefficients of this preferred embodiment | | | | | |
|---|---|---|---|---|---|
| A8 = | −7.12227E−02 | 3.61147E−03 | 3.26318E−02 | 7.60087E−03 | 2.23618E−03 |
| A10 = | 6.02928E−02 | −8.71349E−03 | −1.23000E−02 | −6.31923E−04 | −6.93179E−05 |
| A12 = | −3.65624E−02 | 1.17580E−02 | 1.06168E−03 | 5.83293E−05 | −3.40002E−05 |
| A14 = | 1.31230E−02 | −5.19556E−03 | 1.01428E−04 | −4.21234E−06 | −1.97031E−06 |
| A16 = | | | | −1.10947E−07 | 9.46402E−07 |

With reference to Table 27 and FIG. 9B for an optical imaging lens assembly of this preferred embodiment, the optical imaging lens assembly has a focal length f=4.36 (mm), an overall aperture value (f-number) Fno=2.58, and a half of maximum view angle HFOV=33.1°. After the optical data of this preferred embodiment are calculated and derived, the optical imaging lens assembly satisfies related conditions as shown in Table 29 below, and the related symbols have been described above and thus will not be described again.

TABLE 29

| Data of related relations of this preferred embodiment | |
|---|---|
| Relation | Data |
| $R_8/R_9$ | 1.16 |
| $v_1 - v_2$ | 34.5 |
| $v_1 - (v_2 + v_3)$ | −21.4 |
| $R_9/f$ | −0.23 |
| $(R_7 + R_8)/(R_7 - R_8)$ | 1.15 |
| $(R_9 + R_{10})/(R_9 - R_{10})$ | −0.81 |
| $T_{45}/f$ | 0.06 |
| $f/f_5$ | −2.64 |
| $f/f_4$ | 1.91 |
| $S_D/T_D$ | 0.94 |
| TTL/ImgH | 1.75 |

According to the optical data as shown in Table 27 and the aberration curves as shown in FIG. 9B, the optical imaging lens assembly in accordance with this preferred embodiment of the present invention provides good correction results in aspects of the longitudinal spherical aberration, astigmatic field curving, and distortion.

<Tenth Preferred Embodiment>

Figure 10A:
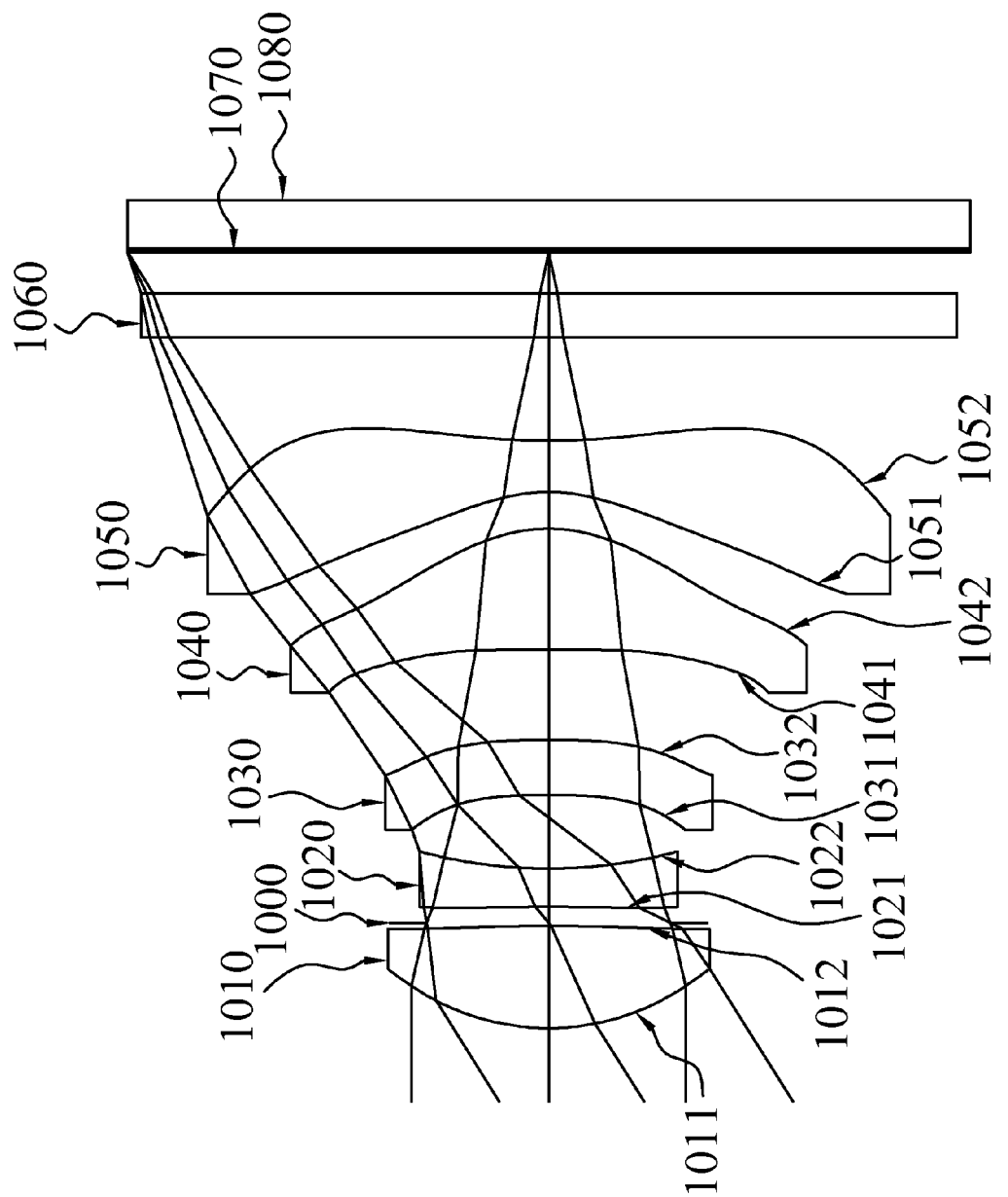
FIG. 10A is a schematic view of an optical lens in accordance with the tenth preferred embodiment of the present invention.
Figure 10B:
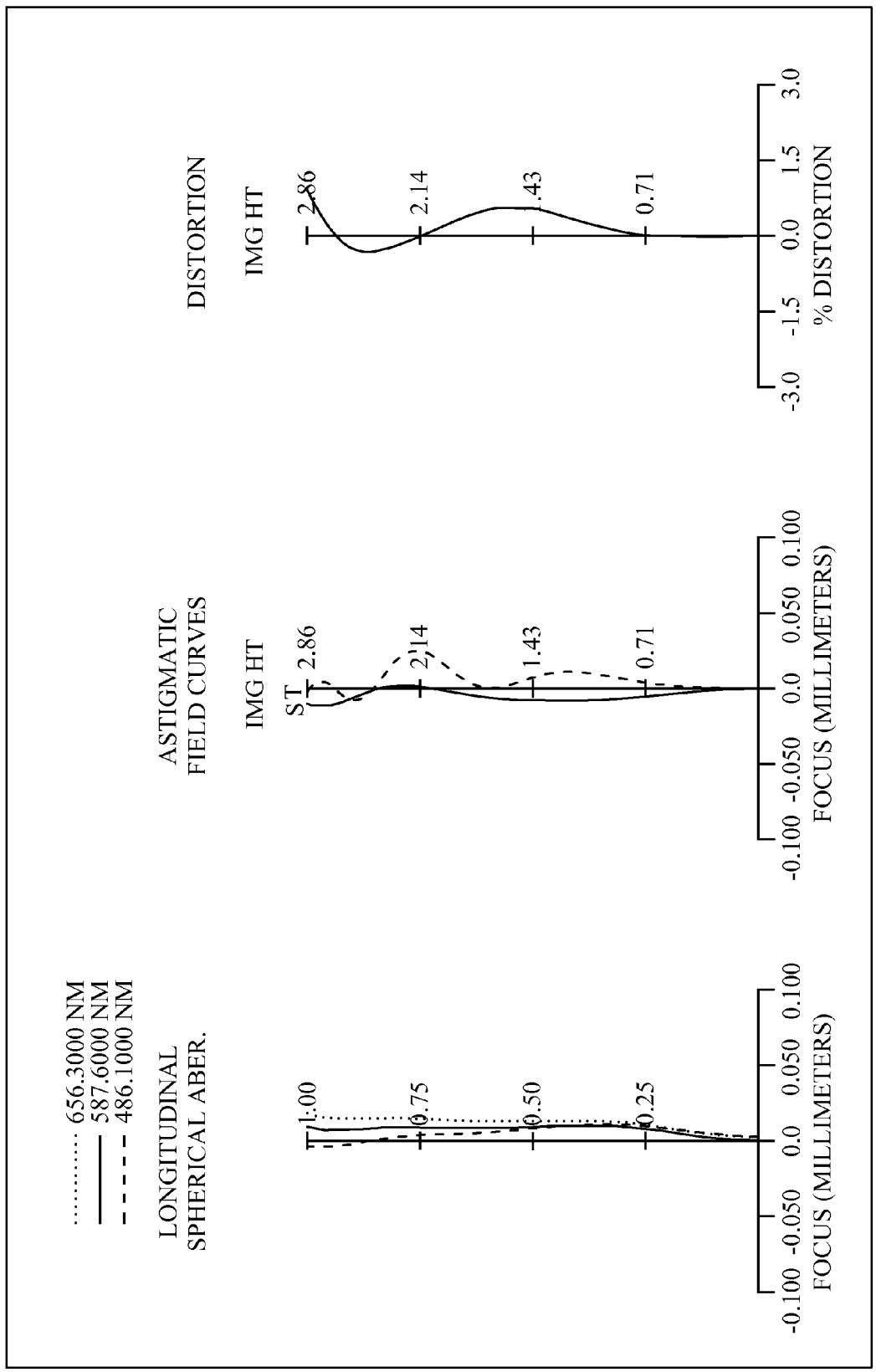
FIG. 10B is a schematic view of a series of aberration curves of the tenth preferred embodiment of the present invention.

With reference to FIGS. 10A and 10B for a schematic view and a series of aberration curves of an optical image lens assembly in accordance with the tenth preferred embodiment of the present invention respectively, the optical imaging lens assembly comprises five non-cemented lenses with refractive power, an aperture stop 1000 and an IR-filter 1060. More specifically, the optical imaging lens assembly, sequentially arranged from an object side to an image side along an optical axis, comprises: a plastic first lens element 1010 with positive refractive power, having a convex object-side surface 1011 and a convex image-side surface 1012, and both object-side surface 1011 and image-side surface 1012 thereof being aspheric; an aperture stop 1000; a plastic second lens element 1020 with negative refractive power, having a concave object-side surface 1021 and a concave image-side surface 1022, and both object-side surface 1021 and image-side surface 1022 thereof being aspheric; a plastic third lens element 1030 with negative refractive power, having a concave object-side surface 1031 and a convex image-side surface 1032, and both object-side surface 1031 and image-side surface 1032 being aspheric; a plastic fourth lens element 1040 with positive refractive power, having a convex object-side surface 1041 and a convex image-side surface 1042, and both object-side surface 1041 and image-side surface 1042 being aspheric; a plastic fifth lens element 1050 with negative refractive power, having a concave object-side surface 1051 and a concave image-side surface 1052, and both object-side surface 1051 and image-side surface 1052 thereof being aspheric, and at least one of the object-side surface 1051 and image-side surface 1052 thereof having at least one inflection point; a glass IR-filter 1060, made of panel glass for adjusting a wavelength section of the light of an image; and an image sensor 1080 installed at an image plane 1070. With the combination of the five lens elements, the aperture stop 1000 and the IR-filter 1060, an image of the object to be photographed can be formed at the image sensor 1080.

TABLE 30

Optical data of this preferred embodiment
f = 4.52 mm, Fno = 2.43, HFOV = 32.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.665870 (ASP) | 0.695 | Plastic | 1.544 | 55.9 | 2.67 |
| 2 | | −9.631400 (ASP) | 0.017 | | | | |
| 3 | Ape. Stop | Plano | 0.111 | | | | |
| 4 | Lens 2 | −15.955800 (ASP) | 0.260 | Plastic | 1.633 | 23.4 | −4.37 |
| 5 | | 3.363200 (ASP) | 0.501 | | | | |
| 6 | Lens 3 | −5.185800 (ASP) | 0.373 | Plastic | 1.633 | 23.4 | −31.38 |
| 7 | | −7.214400 (ASP) | 0.611 | | | | |
| 8 | Lens 4 | 34.356000 (ASP) | 0.821 | Plastic | 1.544 | 55.9 | 1.92 |
| 9 | | −1.067820 (ASP) | 0.249 | | | | |
| 10 | Lens 5 | −1.154740 (ASP) | 0.350 | Plastic | 1.535 | 56.3 | −1.71 |
| 11 | | 4.830900 (ASP) | 0.700 | | | | |
| 12 | IR-filter | Plano | 0.300 | Glass | 1.517 | 64.2 | |
| 13 | | Plano | 0.278 | | | | |
| 14 | Image | Plano | — | | | | |

Note:
Reference wavelength is 587.6 nm.
ASP stands for aspherical surfaces.

The optical data of this preferred embodiment are listed in Table 30, wherein the object-side surface and the image-side surface of the first lens element 1010 to the fifth lens element 1050 comply with the aspheric surface formula as given in Equation (14), and their aspheric coefficients are listed in Table 31 as follows:

TABLE 31

Aspheric coefficients of this preferred embodiment

| Surface # | 1 | 2 | 4 | 5 | 6 |
|---|---|---|---|---|---|
| k = | −7.05176E−01 | −1.00000E+00 | 2.64902E+02 | −1.00000E+00 | −5.57502E+01 |
| A4 = | 1.77464E−02 | 4.95414E−02 | 4.97176E−02 | −1.28393E−02 | −2.71828E−01 |
| A6 = | 2.29635E−02 | −3.95821E−02 | −6.26360E−03 | 1.60346E−02 | 8.57194E−02 |
| A8 = | −4.47880E−02 | 4.01476E−02 | −3.21105E−03 | 3.02444E−02 | −1.22238E−01 |
| A10 = | 5.63473E−02 | −3.82602E−02 | 7.98554E−02 | −6.66269E−02 | 4.79552E−02 |
| A12 = | −3.40211E−02 | 1.11513E−02 | −1.31953E−01 | 4.80269E−02 | 3.72205E−02 |
| A14 = | 6.31528E−03 | 2.86369E−03 | 8.41915E−02 | 7.66567E−09 | 7.64028E−09 |

| Surface # | 7 | 8 | 9 | 10 | 11 |
|---|---|---|---|---|---|
| k = | −1.00000E+00 | 2.00000E+02 | −1.03629E+00 | −2.79849E+00 | −1.00000E+00 |
| A4 = | −1.97287E−01 | −1.44461E−01 | 1.02012E−01 | 9.55319E−02 | −2.53796E−02 |
| A6 = | 1.02856E−01 | 5.63103E−02 | −4.14257E−02 | −4.22517E−02 | −6.81526E−03 |
| A8 = | −8.92083E−02 | 1.05429E−02 | 3.49400E−02 | 7.74576E−03 | 1.61792E−03 |
| A10 = | 6.54822E−02 | −1.70016E−02 | −1.19017E−02 | −6.54463E−04 | −6.48162E−05 |
| A12 = | −1.81216E−02 | 6.53248E−03 | 1.05322E−03 | 5.55113E−05 | −2.87615E−05 |
| A14 = | 7.88890E−03 | −1.32392E−03 | 4.18746E−05 | −3.58259E−06 | −1.56491E−06 |
| A16 = | | | | −1.15024E−07 | 7.98686E−07 |

With reference to Table 30 and FIG. 10B for an optical imaging lens assembly of this preferred embodiment, the optical imaging lens assembly has a focal length f=4.52 (mm), an overall aperture value (f-number) Fno=2.43, and a half of maximum view angle HFOV=32.0°. After the optical data of this preferred embodiment are calculated and derived, the optical imaging lens assembly satisfies related conditions as shown in Table 32 below, and the related symbols have been described above and thus will not be described again.

TABLE 32

Data of related relations of this preferred embodiment

| Relation | Data |
|---|---|
| $R_8/R_9$ | 0.92 |
| $v_1 − v_2$ | 32.5 |
| $v_1 − (v_2 + v_3)$ | 9.1 |
| $R_9/f$ | −0.26 |
| $(R_7 + R_8)/(R_7 − R_8)$ | 0.94 |
| $(R_9 + R_{10})/(R_9 − R_{10})$ | −0.61 |
| $T_{45}/f$ | 0.06 |
| $f/f_5$ | −2.64 |
| $f/f_4$ | 2.35 |
| $S_D/T_D$ | 0.82 |
| TTL/ImgH | 1.81 |

According to the optical data as shown in Table 32 and the aberration curves as shown in FIG. 10B, the optical imaging lens assembly in accordance with this preferred embodiment of the present invention provides good correction results in aspects of the longitudinal spherical aberration, astigmatic field curving, and distortion.

In the optical imaging lens assembly of the present invention, the lens element can be made of glass or plastic. If the lens element is made of glass, the selection of refractive power for the optical imaging lens assembly can be more flexible. If the lens element is made of plastic, then the production cost can be reduced effectively.

In the optical imaging lens assembly of the present invention, if the lens element has a convex surface, then the surface of the lens element is convex at a position near the optical axis; and if the lens element has a concave surface, then the surface of the lens element is concave at a position near the optical axis.

In the optical imaging lens assembly of the present invention, at least one stop such as a glare stop or a field stop can be provided for reducing stray lights to improve the image quality.

Tables 1 to 32 show changes of values of an optical imaging lens assembly in accordance with different preferred embodiments of the present invention respectively, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical imaging lens assembly, comprising five non-cemented lenses with refractive power, sequentially arranged from an object side to an image side comprising:

a first lens element with positive refractive power;

a second lens element with negative refractive power;

a third lens element with refractive power having a concave object-side surface, and at least one of the object-side surface and an image-side surface thereof being aspheric;

a plastic fourth lens element with positive refractive power having both apsheric object-side surface and image-side surface; and a plastic fifth lens element with negative refractive power having a concave object-side surface and a convex image-side surface, and both object-side surface and image-side surface thereof being aspheric;

wherein f is a focal length of the optical imaging lens assembly, $f_4$ is a focal length of the fourth lens element, $R_7$ is a curvature radius of the object-side surface of the fourth lens element, $R_8$ is a curvature radius of the image-side surface of the fourth lens element, and the following relations are satisfied:

$1.55 < f/f_4 < 3.50$; and $0.4 < (R_7 + R_8)/(R_7 − R_8) < 2.5$.

2. The optical imaging lens assembly of claim 1, wherein the first lens element has a convex object-side surface, and the fourth lens element has a convex image-side surface.

3. The optical imaging lens assembly of claim 2, wherein $R_9$ is a curvature radius near the optical axis of the object-side surface of the fifth lens element, f is the focal length of the optical imaging lens assembly, and the following relation is satisfied:

$$-0.5 < R_9/f < 0.$$

4. The optical imaging lens assembly of claim 3, further comprising a stop, wherein $T_D$ is an axial distance from the object-side surface of the first lens element to the image-side surface of the fifth lens element, $S_D$ is an axial distance from the stop to the image-side surface of the fifth lens element, and the following relation is satisfied:

$$0.70 < S_D/T_D < 1.20.$$

5. The optical imaging lens assembly of claim 4, wherein f is the focal length of the optical imaging lens assembly, $f_5$ is a focal length of the fifth lens element, and the following relation is satisfied:

$$-3.0 < f/f_5 < -1.7.$$

6. The optical imaging lens assembly of claim 4, wherein $v_1$ is an Abbe number of the first lens element, $v_2$ is an Abbe number of the second lens element, and the following relation is satisfied:

$$28 < v_1 - v_2 < 45.$$

7. The optical imaging lens assembly of claim 3, wherein $T_{45}$ is an axial distance between the fourth lens element and the fifth lens element, f is the focal length of the optical imaging lens assembly, and the following relation is satisfied:

$$0.02 < T_{45}/f < 0.18.$$

8. The optical imaging lens assembly of claim 3, wherein $v_1$ is an Abbe number of the first lens element, $v_2$ is an Abbe number of the second lens element, $v_3$ is an Abbe number of the third lens element, and the following relation is satisfied:

$$-10 < v_1 - (v_2 + v_3) < 20.$$

9. The optical imaging lens assembly of claim 3, wherein $R_9$ is the curvature radius of the object-side surface of the fifth lens element, f is the focal length of the optical imaging lens assembly, and the following relation is satisfied:

$$-0.3 < R_9/f < 0.$$

10. The optical imaging lens assembly of claim 3, wherein $R_9$ is the curvature radius of the object-side surface of the fifth lens element, $R_{10}$ is a curvature radius of the image-side surface of the fifth lens element, and the following relation is satisfied:

$$-2.0 < (R_9 + R_{10})/(R_9 - R_{10}) < -1.02.$$

11. The optical imaging lens assembly of claim 3, further comprising an image sensor at an image plane for imaging an object to be photographed, wherein TTL is a distance from the object-side surface of the first lens element to the image plane, ImgH is half of the diagonal length of an effective photosensitive area of the image sensor, and the following relation is satisfied:

$$TTL/ImgH < 1.95.$$

12. The optical imaging lens assembly of claim 3, wherein at least one of the object-side surface and the image-side surface of the fifth lens element has at least one inflection point.

13. The optical imaging lens assembly of claim 2, wherein $R_8$ is the curvature radius of the image-side surface of the fourth lens element, $R_9$ is a curvature radius of the object-side surface of fifth lens element, and the following relation is satisfied:

$$0.9 < R_8/R_9 < 1.25.$$

14. The optical imaging lens assembly of claim 2, wherein $R_7$ is the curvature radius of the object-side surface of the fourth lens element, $R_8$ is the curvature radius of the image-side surface of the fourth lens element, and the following relation is satisfied:

$$0.6 < (R_7 + R_8)/(R_7 - R_8) < 1.9.$$

15. An optical imaging lens assembly, comprising five non-cemented lenses with refractive power, sequentially arranged from an object side to an image side comprising:
a first lens element with positive refractive power;
a second lens element with negative refractive power;
a third lens element with negative refractive power having at least one aspheric object-side surface and image-side surface;
a plastic fourth lens element with positive refractive power having both aspheric object-side surface and image-side surface; and
a plastic fifth lens element with negative refractive power having a concave object-side surface and a convex image-side surface, and both object-side surface and image-side surface thereof being aspheric;
wherein $R_7$ is a curvature radius of the object-side surface of the fourth lens element, $R_8$ is a curvature radius of the image-side surface of the fourth lens element, and the following relation is satisfied:

$$0.4 < (R_7 + R_8)/(R_7 - R_8) < 2.5.$$

16. The optical imaging lens assembly of claim 15, wherein $R_9$ is a curvature radius of the object-side surface of fifth lens element, f is a focal length of the optical imaging lens assembly, and the following relation is satisfied:

$$-0.5 < R_9/f < 0.$$

17. The optical imaging lens assembly of claim 16, wherein f is the focal length of the optical imaging lens assembly, $f_4$ is a focal length of the fourth lens element, $f_5$ is a focal length of the fifth lens element, and the following relations are satisfied:

$$1.55 < f/f_4 < 3.50;\text{ and}$$

$$-3.0 < f/f_5 < -1.7.$$

18. The optical imaging lens assembly of claim 16, wherein $v_1$ is an Abbe number of the first lens element, $v_2$ is an Abbe number of the second lens element, $v_3$ is an Abbe number of the third lens element, and the following relation is satisfied:

$$-10 < v_1 - (v_2 + v_3) < 20.$$

19. The optical imaging lens assembly of claim 16, wherein $R_8$ is the curvature radius of the image-side surface of the fourth lens element, $R_9$ is the curvature radius of the object-side surface of fifth lens element, and the following relation is satisfied:

$$0.9 < R_8/R_9 < 1.25.$$

20. The optical imaging lens assembly of claim 16, wherein $R_9$ is the curvature radius of the object-side surface of the fifth lens element, $R_{10}$ is a curvature radius of the image-side surface of the fifth lens element, and the following relation is satisfied:

$$-2.0 < (R_9 + R_{10})/(R_9 - R_{10}) < -1.02.$$

21. The optical imaging lens assembly of claim 16, wherein at least one of the object-side surface and the image-side surface of the fifth lens element has at least one inflection point.

22. An optical imaging lens assembly, comprising five non-cemented lenses with refractive power, sequentially arranged from an object side to an image side, comprising:
- a first lens element with positive refractive power;
- a second lens element with negative refractive power;
- a third lens element with refractive power having at least one aspheric surface;
- a plastic fourth lens element with positive refractive power having both aspheric object-side surface and image-side surface; and
- a plastic fifth lens element with negative refractive power having a concave object-side surface and a convex image-side surface, and both object-side surface and image-side surface thereof being aspheric, and at least one of the object-side surface and image-side surface thereof having at least one inflection point;
- wherein f is a focal length of the optical imaging lens assembly, $f_4$ is a focal length of the fourth lens element, $R_9$ is a curvature radius of the object-side surface of fifth lens element, and the following relations are satisfied:

$1.55 < f/f_4 < 3.50$; and $-0.5 < R_9/f < 0$.

23. The optical imaging lens assembly of claim 22, wherein $R_7$ is a curvature radius of the object-side surface of the fourth lens element, $R_8$ is a curvature radius of the image-side surface of the fourth lens element, and the following relation is satisfied:

$0.6 < (R_7 + R_8)/(R_7 - R_8) < 1.9$.

24. The optical imaging lens assembly of claim 22, wherein $R_8$ is a curvature radius of the image-side surface of the fourth lens element, $R_9$ is the curvature radius of the object-side surface of fifth lens element, and the following relation is satisfied:

$0.9 < R_8/R_9 < 1.25$.

25. The optical imaging lens assembly of claim 22, wherein f is the focal length of the optical imaging lens assembly, $f_4$ is the focal length of the fourth lens element, $f_5$ is a focal length of the fifth lens element, and the following relations are satisfied:

$1.55 < f/f_4 < 3.50$; and $-3.0 < f/f_5 < -1.7$.

* * * * *